US008176518B1

(12) United States Patent
Junkin et al.

(10) Patent No.: US 8,176,518 B1
(45) Date of Patent: May 8, 2012

(54) SYSTEMS AND METHODS FOR PROVIDING FANTASY SPORTS CONTESTS BASED ON SUBEVENTS

(75) Inventors: William Junkin, Corona del Mar, CA (US); Dave Barber, Tulsa, OK (US)

(73) Assignee: Rovi Technologies Corporation, Santa Clara, CA (US)

( * ) Notice: Subject to any disclaimer, the term of this patent is extended or adjusted under 35 U.S.C. 154(b) by 2870 days.

(21) Appl. No.: 10/234,986

(22) Filed: Aug. 30, 2002

(51) Int. Cl.
*G06F 3/00* (2006.01)
*G06F 13/00* (2006.01)
*H04N 5/445* (2011.01)

(52) U.S. Cl. .................. 725/61; 725/9; 725/10
(58) Field of Classification Search ............... 725/9, 10, 725/61
See application file for complete search history.

(56) References Cited

U.S. PATENT DOCUMENTS

| | | | | |
|---|---|---|---|---|
| 4,918,603 | A | 4/1990 | Hughes et al. | 364/410 |
| 5,018,736 | A | 5/1991 | Pearson et al. | 273/439 |
| 5,263,723 | A | 11/1993 | Pearson et al. | 273/439 |
| 5,846,132 | A | 12/1998 | Junkin | 463/42 |
| 5,860,862 | A * | 1/1999 | Junkin | 463/40 |
| 5,971,854 | A | 10/1999 | Pearson et al. | 463/41 |
| 6,193,610 | B1 | 2/2001 | Junkin | 463/40 |
| 6,371,855 | B1 * | 4/2002 | Gavriloff | 463/42 |
| 6,837,789 | B2 | 1/2005 | Garahi et al. | |
| 6,837,791 | B1 | 1/2005 | McNutt et al. | |
| 7,001,279 | B1 | 2/2006 | Barber et al. | |
| 2001/0036853 | A1 | 11/2001 | Thomas | |
| 2002/0029381 | A1 * | 3/2002 | Inselberg | 725/9 |
| 2002/0115488 | A1 * | 8/2002 | Berry et al. | 463/42 |
| 2004/0117831 | A1 | 6/2004 | Ellis et al. | |

FOREIGN PATENT DOCUMENTS

| | | |
|---|---|---|
| WO | WO 01/33482 | 5/2001 |
| WO | WO 03/015403 | 2/2003 |

OTHER PUBLICATIONS

"2000 Fantasy Football, Help Topics," Fantasy Sports Properties, Inc.
"2000 Fantasy Hockey, Help Topics," Fantasy Sports Properties, Inc.
"2001 Fantasy Baseball, Help Topics," Fantasy Sports Properties, Inc.
Cliff Charpentier, "1984 Fantasy Football Digest," Fantasy Sports Inc., Jun. 1984.
Jim Donaldson, "The Official Fantasy Football League Manual," Contemporary Books, Inc., 1985.

(Continued)

*Primary Examiner* — Pankaj Kumar
*Assistant Examiner* — Charles N Hicks
(74) *Attorney, Agent, or Firm* — Ropes & Gray LLP

(57) ABSTRACT

Fantasy sports contests based on segments of a single sports event. A segment or subevent may be a portion of a single sports event. The users choose a roster of selections to form an fantasy sports contest team roster. Fantasy points are awarded to the user for the real-life performance of the selections on the fantasy sports contest team roster according to rules of the fantasy sports contest. In one embodiment, the user is presented with bonus questions asking for predictions on the outcome of real-life action during a subevent of the a televised competition. Fantasy points may be awarded to users making correct predictions. The bonus questions may supplement fantasy scoring from the users' team rosters, or may be presented as a stand alone interactive sports contest.

28 Claims, 26 Drawing Sheets

OTHER PUBLICATIONS

Cliff Charpentier, "1985 Fantasy Football Digest," Lerner Publications Company, 1985.

"All Pro Yearbook 1987: The Fantasy Football Magazine," All Pro Publishing Company, 1987.

BBC Sport, *Fantasy Football Monthly, The Game* <http://bbcfootball.fantasyleague.co.uk/ et al.> (accessed Sep. 17, 2002).

CNN Sports Illustrated, *Fantasy Football Challenge* <http://footballl2201.si.cnn.com/ et al.> (accessed Sep. 23, 2002).

CNN Sports Illustrated, *Fantasy Golf Challenge* <http://gold5.si.cnn.com/ et al.> (accessed Sep. 23, 2002).

CNN Sports Illustrated, *Fantasy Nascar Challenge* <http://racing20.si.cnn.com/ et al.> (accessed Sep. 23, 2002).

CBS SportsLine.com, *John B. Sample League* <http://cbs.sportsline.com/> ( accessed Nov. 24, 1999).

CBS SportsLine.com, *Fantasy Baseball* <http://baseball101.fantasy.sportsline.com/ et al.> (accessed Sep. 23-24, 2002).

CBS SportsLine.com, *Fantasy Football* <http://football2145.fantasy.sportsline.com et al.> (accessed Sep. 23-24, 2002).

CBS SportsLine.com, *Fantasy Golf* <http://golf1.fantasy.sportsline.com/ et al.> (accessed Sep. 23, 2002).

CBS SportsLine.com, *Fantasy Hockey* <http://hockey2102.fantasy.sportsline.com/ et al.> (accessed Sep. 23-24, 2002).

CBS SportsLine.com, *Fantasy Racing* <http://racing.fantasy.sportsline.com/ et al.> (accessed Sep. 23, 2002).

ESPN Internet Ventures, *ESPN Fantasy Games* <http://games.espn.go.com/cgi/home/request.dll?FRONTPAGE et al.> (accessed Sep. 16-18, 2002).

"Fantasy-Football," Franchise Football League.

"Strat-O-Matic Pro Football," Strat-O-Matic Game Co. Inc.

"2000 Fantasy Basketball, Help Topics," Fantasy Sports Properties, Inc.

* cited by examiner

FORM LEAGUE

Maximum No. Of Users: [8] ~702

Entry Criteria:
☐ Min ↓ Skill Level Of Veteran ↓  ~706
☐ Buddies Only

SEARCH LEAGUES

Names: | John Doe; Jane Smith; Jeff Smith | — 910

Location: | New York, NY | — 920

Skill Level: | Rookie | — 930

CREATE CONTEST

Scoring:
- ☑ 3 Pt Shots ---- ☐ Pt(s)
- ☐ 2 Pt Shots ---- ☐ Pt(s)
- ☐ Dunk Bonus ---- ☐ Pt(s)
- ☐ Steals ---- ☐ Pt(s)
- ☐ Rebounds ---- ☐ Pt(s)
- ☐ Blocks ---- ☐ Pt(s)

Duration: [In Next Quarter →] — 2210

[Send To Buddies] — 2206

SYSTEMS AND METHODS FOR PROVIDING FANTASY SPORTS CONTESTS BASED ON SUBEVENTS

BACKGROUND OF THE INVENTION

This invention relates to fantasy sports contest systems and methods and, more particularly, fantasy sports contests based on subevents within a sporting event.

Athletic endeavors have long supported a broad range of secondary competitions which include wagering on the outcome of particular games and wagering on the performance of a particular player.

In known fantasy sports contests, the user selects a roster, a team, a particular individual, or a group of individuals in an athletic contest. The user of a fantasy sports contest system is given the ability to take on the role of a fictional general manager with powers which may include the ability to draft, trade, dismiss and otherwise manage the player or players on the user's fantasy sports team.

Conventionally, the rules in a fantasy sports contest are set by a fantasy sports contest system provider, or are set by a league commissioner who sets the rules under which a group of fantasy or rotisserie sports game users competes against each other. For example, for every goal scored in real-life by a member of the user's fantasy soccer team, a conventional fantasy sports contest system might award five points to the user in the fantasy competition.

A provider of a conventional fantasy sports contest system may also provide additional services, which include providing statistical information on real-life games and players, tracking users' scores in the fantasy contest, and enabling transactions and other interactions among the users.

A fantasy sports contest may be based on a variety of real-life athletic events, and typically involves users selecting players from real-life team sports (e.g., football, baseball, basketball, hockey, soccer or rugby), selecting players from real-life sports where individuals compete (e.g., golf, tennis or automotive racing), or selecting competitors from competitions involving animals (e.g., horse and dog racing). The user's selections are typically stored in the user's fantasy sports contest roster. The performance of these selections in real-life competition determines the user's performance in the fantasy sports competition.

A fantasy sports contest goes beyond traditional one-time wagering applications (e.g., selecting picks for the winners of a weekend's football games or picking who will win a most valuable player award).

Known fantasy sports contests are based on the cumulative performance of the user's selections over a prolonged period (e.g., an entire season in the subject sport). In order to succeed, the user must devote a large amount of time in order to manage a fantasy sports contest team roster as a season progresses. This necessary commitment over a prolonged period can inhibit user interest in a fantasy sports contest, especially among users interested in fantasy sports contests on a casual basis. In many cases, users lose interest and stop participating in the fantasy sports contest as a season progresses, especially if the user has fallen behind in the rankings. The prolonged and involved nature of known fantasy sports contests also restricts its popularity with would-be users having only an interest in a single sporting event (e.g., the Super Bowl™), or would-be users having a casual interest in a segment of a televised sports contest.

SUMMARY OF THE INVENTION

In view of the foregoing, the present invention provides a fantasy sports contest based on subevents of a sports event.

This and other objects of the invention are accomplished in accordance with the principles of the present invention by providing a fantasy sports contest application for implementing a fantasy sports contest based on subevents.

The fantasy sports contest application of the present invention may be any suitable software, hardware, or both that may be used to implement the features of the present invention. The fantasy sports contest application may be implemented on any suitable platform, or on any suitable combination of platforms. For example, the user may access the fantasy sports contest application using a cellular phone, mobile communications devices, PDAs, PCs, tablet PCs, telephones, and any other suitable communication device. For example, in an interactive television system, the fantasy sports contest application may be implemented using a multichannel set-top box receiver, a two-way remote control, any other suitable device or any suitable combination of devices.

In an interactive television application, the fantasy sports contest application may be invoked by pressing one or more buttons on a remote control, by making a selection from a menu or other presentation of user-selectable choices, or by other suitable means by which a selection can be made (e.g., a speech recognition command interface). Alternatively, the fantasy sports contest application may be automatically invoked (e.g., upon a user tuning to a fantasy sports contest enabled television broadcast).

The fantasy sports contests of the present invention is not limited to traditional fantasy sports contests which are usually season-long contests based on the real-life performance of a roster of user selections. Included in the fantasy sports contests of the present invention are fantasy sports contests that last for all or a part of a season, fantasy sports contests that last for the duration of a single sports event (e.g., a round of golf) or a subevent thereof (e.g., nine holes of golf), interactive sports contests that deal with discrete subevents (e.g., a contest addressing whether one or more golfers will make a hole-in-one on a particular hole), and other interactive sports contests in which the user's performance is determined, at least in part, by what happens in a real-life sporting event.

The present invention may offer one or more traditional fantasy sports contests without including the added aspects (e.g., contests based on discrete subevents) of the more broadly defined fantasy sports contest described previously. Such applications would be categorized as "traditional fantasy sports applications."

The fantasy sports contest application of the present invention may assign the user to a competitive grouping (i.e., league) by geographic location, skill level, a combination of these methods, or any other suitable method. The fantasy sports contest application may have access to information on the user's prior entries in fantasy sports contests, and information on the user's performance in those entries. This information may be used to assign each user a skill level attribute, and users of similar skill level may be grouped together in a competitive grouping.

Alternatively, the fantasy sports contest application may enable the user to compete against a select group of users in a "buddy" league. These leagues may be pre-formed by users through the prior purchase of a league pass into the fantasy sports contest, may be instantly formed using a league forum chat room, a search tool, a combination of methods or any other suitable method.

In one embodiment, a fantasy sports contest in accordance with the present invention may be based on the performance of the user's roster of selections (e.g., athletes on the user's fantasy sports contest team roster) over a subevent of a sports event. As used with respect to the present invention, a subevent is a segment of real-life action within a sports event. For example, a subevent may be a quarter of play in a basketball game, a single hole in a golf round, or a period of play in a hockey game, etc. By providing a fantasy sports contest based on a segment of a real-life sports event, more than one fantasy sports contest may be held during the course of a single sports event. For example, a fantasy sports contest may be held that last the duration of each predefined period of play in a real-life contest.

In one suitable approach, the fantasy sports contest application may be presented in conjunction with a television broadcast of a sports event. The fantasy sports contest application may enable the user to select athletes competing in the televised competition for the user's fantasy sports contest team roster. Instant fantasy scoring information may be provided by the fantasy sports contest application to the user. The fantasy sports contest application may enable the user to trade athletes with other users after initially selecting athletes, may enable the user to swap athletes for other athletes competing in the sports event, or both.

In one suitable approach, the fantasy sports contest application of the present invention may implement fantasy sports contests that have staggered starting times. For example, if a user tunes to a television broadcast of a sports event sometime after the start of the sports event, the fantasy sports contest application may enable the user to join in a fantasy sports contest without waiting for a predetermined start time of the next fantasy sports contest.

In one suitable arrangement, the fantasy sports contest application may place users that indicate a desire to join in the fantasy sports contest within a preset time frame (e.g., within fifteen seconds of each other) in the same competitive group. In this way, the user may begin competing in the fantasy sports contest, against the pre-arranged competitive group, almost instantaneously after indicating a desire to do so.

In one suitable arrangement, the fantasy sports contest application may enable the user to begin competing in the fantasy sports contest substantially instantaneously. For example, the fantasy sports contest application may enable the user to compete by aiming for preset score levels, which may represent levels of prizes being offered in the fantasy sports contest. By allowing the user to compete against score levels instead of other users, the fantasy sports contest application enables instant user participation in the fantasy sports contest.

In one suitable approach, the fantasy sports contest application may implement multiple fantasy sports contests having different themes and scoring rules simultaneously. For example, the fantasy sports contest application may simultaneously present multiple fantasy basketball contests, each having different rules for converting real-life action to fantasy points, for the same real-life basketball contest. The fantasy sports contest application may enable the user to choose a favored fantasy sports contest to join from among the available selections.

In one suitable approach, the fantasy sports contest application may divide a fantasy sports contest into subcontests. For example, a fantasy basketball contest application may divide a fantasy basketball contest into subcontests on three point shots, on rebounds, on field goal percentage, on assists, etc. In one suitable arrangement, the user may be automatically entered in the subcontests when competing in the main fantasy sports contest. In one suitable arrangement, the fantasy sports contest application may enable the user to decide whether to compete in the main fantasy sports contest, any subcontest, or any combination thereof.

In one embodiment of the present invention, the fantasy sports contest application may implement fantasy sports contests that pose to the user bonus questions. In one suitable approach, the fantasy sports contest may pose a bonus question asking the user for a prediction on the outcome of real-life action during a subevent in the sports event. For example, a fantasy basketball contest may query the user on whether a certain basketball player will score (e.g., either fantasy or real-life points) on a particular trip down the court. A correct answer may earn the user fantasy points, whereas an incorrect answer may earn no points, or may result in the deduction of points. Multiple bonus questions may be pending at any given time in the fantasy sports contest. It should be understood that although the subjects of the bonus questions in this approach are subevents, a fantasy sports contest involving bonus questions is not limited to a contest based on a segment of a sports event (e.g., a subevent) and may be a traditional fantasy sports contest (e.g., a fantasy sports contest based on an entire season).

Alternatively, the bonus questions may not be based on subevents, and may be trivia questions or other types challenges that may be related to the theme of a television broadcast being shown or the athletes on the user's fantasy sports contest roster.

In one suitable arrangement, bonus questions may be used to supplement fantasy scoring by the user's fantasy sports contest team roster. In this case, the bonus questions posed to the user may be, at least partially, based on the athletes on the user's fantasy sports contest team roster. Alternatively, the bonus questions may be presented independently as a separate interactive sports contest that does not involve a roster of fantasy selections.

In one embodiment, the fantasy sports contest application may enable the user to instantly create a fantasy sports contest based on subevents with a select group of other users. For example, the user watching a basketball contest may instantly create a fantasy sports contest based on slam dunks for the next five minutes of play. The user may propose the contest to select other users, who may elect to participate in the fantasy sports contest. These users may then choose a roster of athletes that they think will perform the most slam dunks in the next five minutes. In one suitable arrangement, the fantasy sports contest application may enable the user to propose user created bonus questions to other users.

In one embodiment, a local provider (e.g., a local cable system operator) may create a local fantasy sports contest for subevents based on a television broadcast being shown locally. For example, the YES Networe™ may provide a fantasy baseball contest for subevents to users in its operating area based on televised New York Yankees™ baseball contests.

In one embodiment, the fantasy sports contest application of the present invention may implement a fantasy sports contest based on subevents that involves more than one sports event. In one suitable approach, the fantasy sports contest may involve a series of sports events over a period of time (e.g., a weekend). For example, the fantasy sports contest may combine the fantasy points earned by the user during each of multiple sports events to arrive at a final tally. In one suitable arrangement, the fantasy sports contest may weigh the fantasy points earned by the user during each of the multiple sports events to emphasize the value of one or more of the sports events.

In one embodiment, the fantasy sports contest of the present invention may be used to implement a fantasy sports contest based on subevents that allows the user to interact with the real-life action of sports event being televised. In one suitable approach, the fantasy sports contest application may enable the user to select a roster of athletes from those competing in the televised sports event. The user may then simulate the real-life action in the sports event involving those athletes in a video game type challenge to earn contest points (e.g., by virtually trying to correctly time swinging at a pitch in baseball).

In one embodiment, the present invention may be applied to a non-sports setting. For example, the present invention may be applied to a contest relating to the Academy Awards™, (a.k.a., the Oscars™). The user may be asked to choose a roster of actors and actresses in each award category, and may be able to trade, swap, and otherwise change the roster after the start of the award show. The contest application may also pose bonus questions based on the user's roster, the instant action in the award show, and other relevant factors. In general, all aspects of the present invention described in a sports related setting may be easily adapted for use in any non-sports setting.

Further features of the invention, its nature, and various advantages will be more apparent from the accompanying drawings and the following detailed description of the preferred embodiments.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 7 is an illustrative fantasy sports contest league forming screen in accordance with one embodiment of the present invention;

FIG. 9 is an illustrative league search screen in accordance with one embodiment of the present invention;

FIG. 22 is an illustrative display screen showing how the user may create a customized fantasy sports contest in accordance with one embodiment of the present invention;

DETAILED DESCRIPTION OF THE PREFERRED EMBODIMENTS

Figure 1:
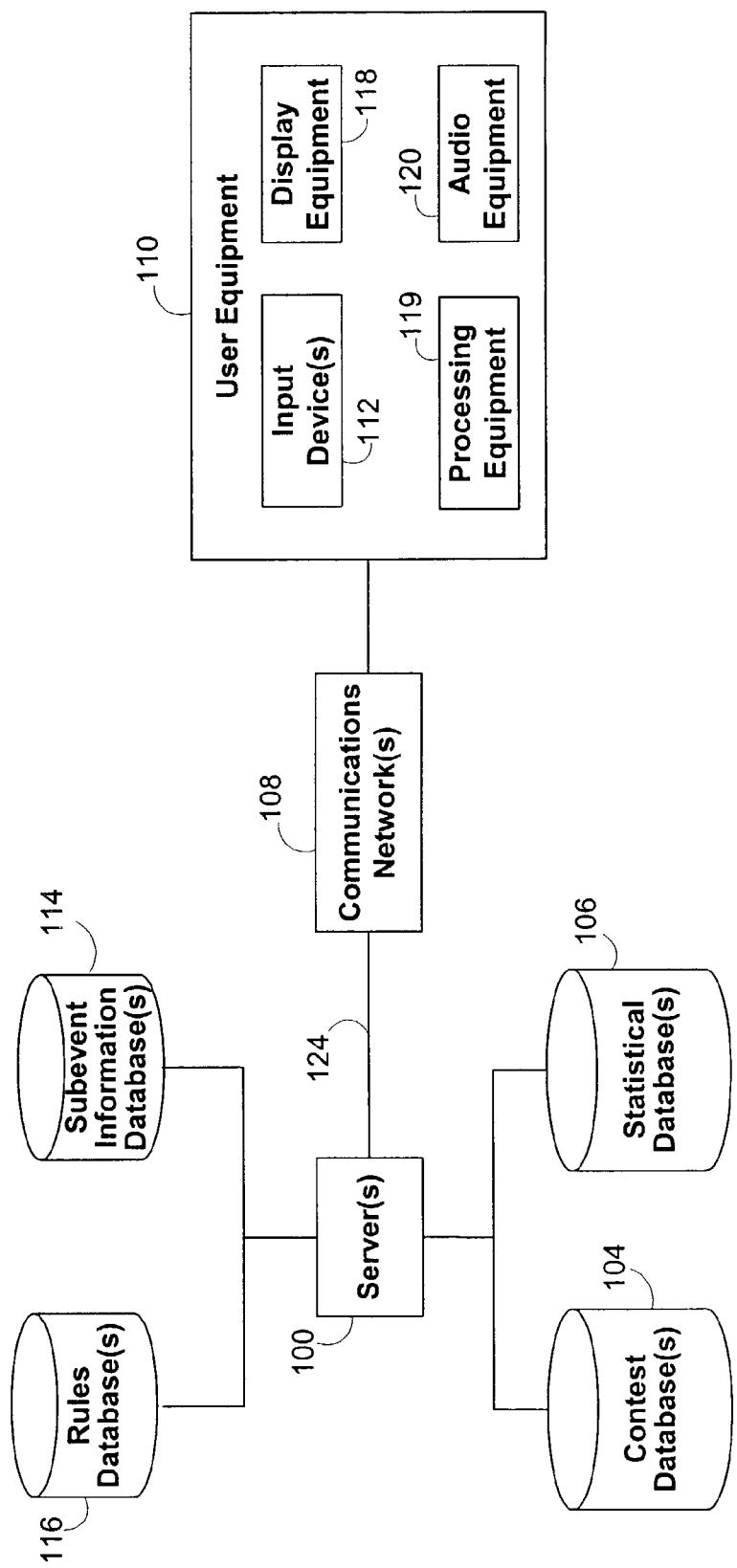
FIG. 1 is a diagram of an illustrative fantasy sports contest system in accordance with one embodiment of the present invention.

The present invention is primarily described herein in terms of the fantasy sports contest application. It will be understood that any other suitable software, hardware, or both may be used in conjunction with the fantasy sports contest application or in place of the fantasy sports contest application to implement some or all of the features of the present invention.

The fantasy sports contest application of the present invention may be any suitable software, hardware, or both that may be used to implement the features of the present invention. The fantasy sports contest application may be implemented at any suitable location in the system described in FIG. 1. For example, the fantasy sports contest application may be implemented at user equipment 110, at server 100, or at any other suitable location (that is not necessarily shown in FIG. 1), or at any combination of locations. For example, certain portions of the fantasy sports contest application may be implemented at user equipment 110 (e.g., those portions that implement features involved in user interaction), whereas certain other portions of the fantasy sports contest application may be implemented at server 100 (e.g., those portions that implement features involved in the processing of client requests and in the tracking of the performance of contestants). Any such suitable arrangement of the fantasy sports contest application may be implemented in accordance with the present invention.

The fantasy sports contest application of the present invention may be used to implement fantasy sports contests that include any suitable sports contest in which the user is given the ability to make decisions that may affect the standing of the user in the sports contest. For example, in typical team-oriented fantasy sports contests, the user may participate in the capacity of a general manager. In this situation, the user may be have responsibilities such as creating a team roster (e.g., drafting players), selecting reserves, making trades, and otherwise managing the composition of the user's team roster. It will be understood that any other suitable decision-making capability may be given to the user in a fantasy sports contest in addition to or in place of those indicated above.

The fantasy sports contest of the present invention need not be limited or restricted in time. For example, a fantasy sports contest may last an entire season, multiple seasons, a portion of the season, a definite period of time (e.g., one month, two weeks, three days, one hour, etc.), the duration of a particular event (e.g., Wimbledon, etc.), a portion of a particular event, or any other suitable period of time.

In one suitable approach, fantasy sports contests may include contests in which the user is not necessarily playing the role of a general manager. For example, fantasy sports contests may involve the user determining or guessing (i.e., blindly or with calculation) whether particular outcomes will occur (e.g., whether a particular golfer will make the next put). Any such suitable decision-making may be the basis of a fantasy sports contest or a part of a fantasy sports contest.

The fantasy sports contests of the present invention may use any suitable one or more scoring systems. For example, existing fantasy scoring systems include straight point systems (e.g., points are awarded and subtracted based on real-life plays without regard to the performance of other players on other fantasy teams in a league), rotisserie systems (e.g., points are awarded based on the user's relative ranking against other users), head-to-head systems (e.g., users in a league are matched against one another in a round-robin series of one-on-one contests during the course of a season). These are merely illustrative scoring systems. Any other suitable scoring system may be used in the fantasy sports contests of the present invention.

It will be understood that the above are merely illustrative elements of fantasy sports contests. Any other suitable arrangement or approach may be used. It will further be understood that the nature of the fantasy sports contests may vary depending on which activity or sport is involved or based on any other suitable criteria.

The fantasy sports contest application of the present invention may provide to the user fantasy sports contest information. Fantasy sports contest information may include any suitable information associated with one or more fantasy sports contests in which the user participates or in which the user may have an interest. For example, fantasy sports contest information may include information regarding the user's one or more rosters, the user's standing in each of the fantasy sports contests in which the user participates, one or more point tallies that the user has accumulated in each of the user's respective fantasy sports contests, information regarding the number of trades the user may make, information regarding the amount of fantasy money the user has available to add players to a roster, information regarding deadlines to make trades or perform any other suitable task associated with one or more fantasy sports contests, or any other suitable information. Fantasy sports contest information may also include information regarding real-life athletes (e.g., names, statistics, etc.), real-life sports leagues (e.g., game schedules, standings, etc.), real-life sporting events (e.g., baseball games, golf tournaments, tennis matches, etc.), sports arenas, weather information, sports commentary, or any other suitable information regarding real-life sports or events that may have an affect on the one or more fantasy sports contest in which the user participates.

Aspects of the operation of fantasy sports contest applications are described in U.S. Pat. Nos. 4,918,603 (Hughes, et al.), 5,846,132 (Junkin), 5,971,854 (Junkin), and 6,193,610 (Junkin), which are all hereby incorporated by reference herein in their entireties.

An illustrative client/server system in accordance with the present invention is shown in FIG. 1. The system illustrated in FIG. 1 may be used as a fantasy sports contest system in accordance with the present invention. A fantasy sports contest application may be at least partially implemented on server 100.

Server 100 may include one or more servers that may be located at a single location or across two or more locations (e.g., in a distributed network arrangement). Server 100 may access one or more databases (e.g., databases 104, 106, 114, and 116) that may store information related to a fantasy sports contest. Databases 104, 106, 114, and 116 may store fantasy sports contest information such as the roster of players available for drafting, the schedule for the fantasy sports contest, fantasy sports contest rules, subevents information (e.g., information on how an event is to be separated into subevents) or any other suitable information related to the fantasy sports contest. Communications network 108 may be a satellite network, a telephone network, an Internet network, a cable network, or any other suitable communication network. If it is desired to transmit video signals over communication network 108, a network that enables relatively high bandwidth transmission (e.g., cable network, satellite network) may be desirable.

The fantasy sports contest information transmitted by server 100 to user equipment 110 includes data which is communicated to users as part of the fantasy sports contest such as statistical information, rosters, standings, graphics, video etc. If desired, some of the fantasy sports contest information may be provided using data sources at facilities other than server 100, which are directly connected to user equipment 110 via communications network 108.

For example, data related to tracking user interaction with the fantasy sports contest application (e.g., to alter the user's roster of athletes) may be communicated to a location that is separate from server 100. Similarly, graphics and video information may be generated by an facility that is separate from server 100.

Server 100 may distribute the fantasy sports contest application and related data to user equipment 110 via communication network 108.

User equipment 110 at each user's location may include processing equipment 119. Processing equipment 119 may be based on a personal computer, a WebTV box, a personal computer television (PC/TV), a cellular phone, a handheld computing device, a PC tablet, etc. Processing equipment 119 may be used to implement the fantasy sports contest application at the user's location. Alternately, the fantasy sports contest application may be partially implemented on server 100 and partially implemented on processing equipment 119.

Fantasy sports contest related data may be distributed to user equipment 110 periodically (e.g., once per hour or once per week). Fantasy sports contest related data may also be distributed continuously or on-demand to user equipment 110. A connection may be established to server 100, and any sources of information independent from server 100 through communications network 108. The fantasy sports contest application may request certain fantasy sports contest related data to be sent from server 100 and independent sources. Server 100 may include a processor to handle these information distribution tasks. User processing equipment 119 may also include a processor to handle tasks associated with implementing a fantasy sports contest application, including requesting appropriate information from server 100.

Server 100 may store information on the user of the fantasy sports contest, which may include information on the user's past history of entries into fantasy sports contests, and the user's performance in those entries. This information may also include any suitable information such as the user's geographic location, demographics data, etc.

At user equipment 110, display equipment 118 displays fantasy sports contest information. The fantasy sports contest information may include audio information. Audio equipment 120 may be used to output audio info. Audio equipment may include speakers found in televisions, speakers for personal computers, or any other suitable audio equipment. The user may use input device 112 to access information related to the fantasy sports contest. Such input devices may include one or more suitable devices such as remote controls, keyboards, voice controlled devices, track balls, computer mice or any other suitable device.

Certain functions such as the user's instructions to make a change in roster choices may require user equipment 110 to transmit data to server 100 over communication network 108. If desired, such data may be transmitted using a communications network separate from communications network 108 used for fantasy sports contest data. If functions such as these are provided using communications networks separate from network 108, some communications originating from user equipment 110 may be made directly with the separate networks.

A number of suitable techniques may be used to distribute graphics and video information for the fantasy sports contest. For example, graphics information may be distributed from server 100 in a continuously-looped arrangement, where the fantasy sports contest application implemented on user processing equipment 119 may capture appropriate graphics and video information for display from the stream of information being transmitted. With such a continuously-looped arrangement, a map indicating the location of the latest graphics and video information may be downloaded periodically to user equipment 110. This allows any databases used in server 100 for storing graphics and video information to be updated. Graphics and video information may be downloaded to user equipment 110 periodically and stored locally. Graphics and video information may be accessed locally when needed by the fantasy sports contest application implemented (at least partially) using processing equipment 119 at the user's location. Another approach involves using the fantasy sports contest application to request graphics and video information when needed. Information on the location of graphics and video information may be downloaded to user equipment 110, and may be updated as needed. The fantasy sports contest application implemented (at least partially) using processing equipment 119 may then request and receive appropriate graphics and video information as needed.

Figure 2:
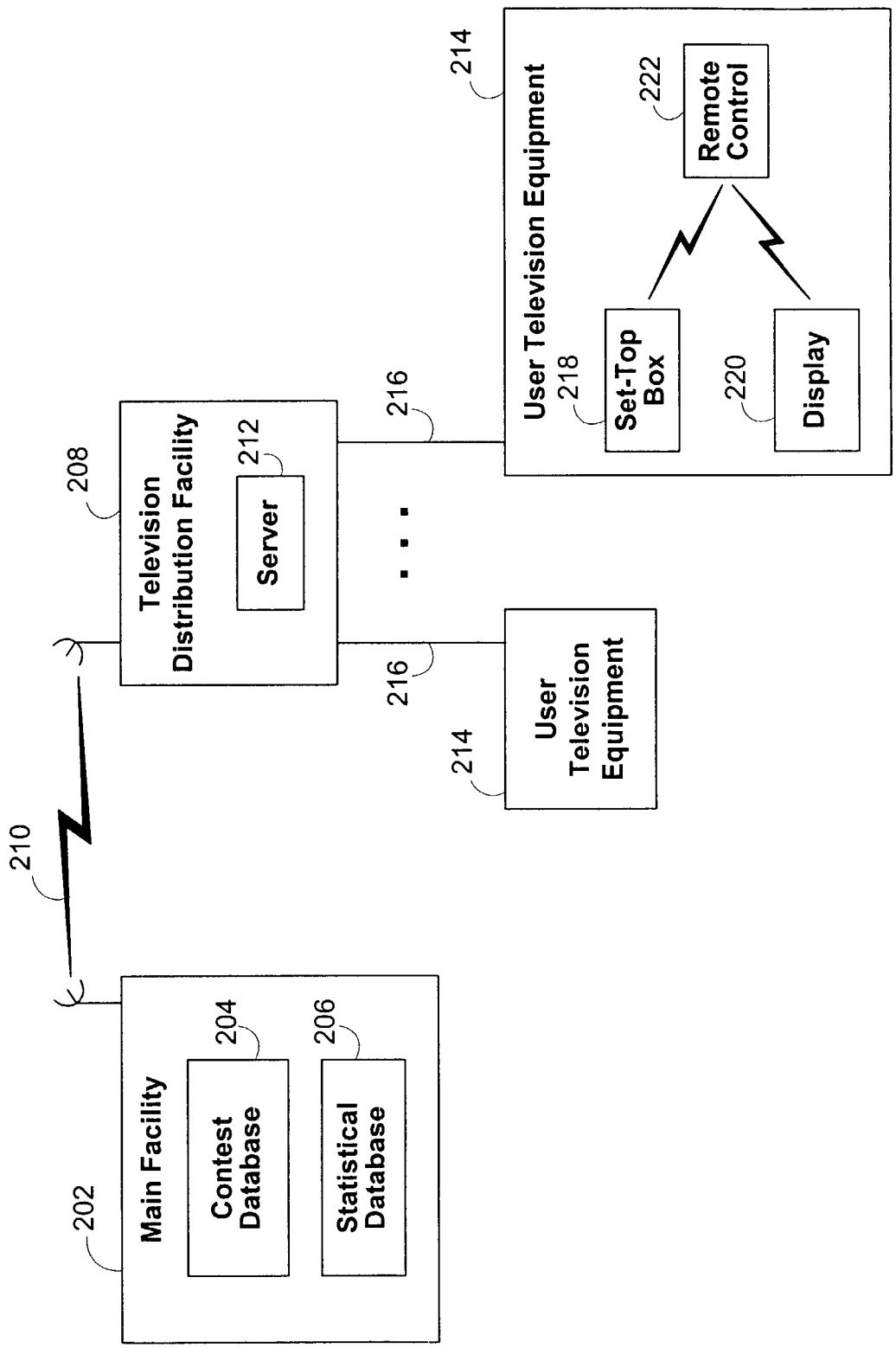
FIG. 2 is a diagram of an illustrative fantasy sports contest television system in accordance with one embodiment of the present invention.

In one embodiment, the fantasy sports contest application of the present invention may be implemented on an interactive television platform. An illustrative fantasy sports contest system in accordance with this embodiment of the present invention is shown in FIG. 2. Main facility 202 may include a fantasy sports contest database 204 for storing fantasy sports contest information such as the roster of players available for drafting, the schedule for the contest, rules, or any other suitable fantasy sports contest information such as graphics and video information. Main facility 202 may also include statistical database 206 for storing real-life and fantasy sports contest statistics on a pool of athletes being used for the fantasy sports contest. Information from databases 204 and 206 may be transmitted to television distribution facility 208 via communications link 210. Link 210 may be a satellite link, a telephone network link, an Internet link, a cable or fiber optic link, a microwave link, a combination of such links, or any other suitable communications link. If it is desired to transmit video signals (e.g., for advertising and promotional videos) over link 210 in addition to data signals, a relatively high bandwidth link such as a satellite link may be preferable to a relatively low bandwidth link such as a telephone line.

Television distribution facility 208 is a facility for distributing television signals to users, such as a cable system head end, a broadcast distribution facility, or a satellite television distribution facility.

The fantasy sports contest information transmitted by main facility 202 to television distribution facility 208 includes data which is communicated to users as part of the contest such as statistical information, rosters, standings, graphics, video, etc. If desired, some of the fantasy sports contest information may be provided using data sources at facilities other than main facility 202.

For example, data related to tracking player interaction with the fantasy sports contest application may be communicated to a location that is separate from main facility 202 and separate from television distribution facility 208. Similarly, graphics and video information may be generated by a facility that is separate from main facility 202 and television distribution facility 208.

Regardless of its source, graphics and video information may be maintained on server 212 within television distribution facility 208 if desired. Server 212 may be based on one or more computers.

Television distribution facility 208 may distribute fantasy sports contest applications and related data to user television equipment 214 or other user equipment via communications paths 216. This information may be distributed over an out-of-band channel on paths 216 and may be distributed using any of a number of suitable techniques.

Each user may have a receiver such as set-top box 218 or other suitable television or computer equipment into which circuitry similar to set-top box circuitry has been integrated. For clarity, the present invention is described primarily in connection with user equipment based on a set-top box arrangement. This is merely illustrative. The fantasy sports contest application may be implemented using user television equipment 214 that is based on a personal computer, a WebTV box, a personal computer television (PC/TV), or handheld computing device, etc. If desired, the fantasy sports contest application may be implemented using a client-server architecture using user television equipment 214 as a client processor and a server such as server 212.

Fantasy sports contest related data such as statistics, standings, graphics, and video may be distributed to set-top box 218 periodically (e.g., once per hour or once per week). Fantasy sports contest related data may also be distributed continuously or on-demand. A connection may be established to television distribution facility 208 using communication link 210. A request for certain fantasy sports contest related data may be sent from set-top box 218 to television distribution facility 208. Television distribution facility 208 may respond by sending information responsive to the request back to set-top box 218 using communications link 216. Main facility 202 may include a processor to handle information distribution tasks. Each set-top box 218 may include a processor to handle tasks associated with implementing a fantasy sports contest application on set-top box 218. Television distribution facility 208 may include a processor for tasks associated with monitoring the user's interactions with the fantasy sports contest implemented on set-top box 218 and for handling tasks associated with the distribution of information related to the fantasy sports contest.

During use of the fantasy sports contest application implemented, at least in part, on set-top box 218, statistical information relating to the fantasy sports contest may be displayed on display 220. Set-top box 218, and display 220, which may be part of a television, may be controlled by one or more remote controls 222 or any other suitable user input interfaces such as a wireless keyboard, a mouse, a trackball, a dedicated set of buttons, etc.

Communications paths 216 preferably have a sufficient bandwidth to allow television distribution facility 208 to distribute scheduled television programming, pay programming, advertisements, promotional product videos, and other video information to set-top box 218 in addition to the fantasy sports contest application and related data. Multiple television and audio channels (analog, digital, or both analog and digital) may be provided to set-top box 218 via communications paths 216. If desired, fantasy sports contest information may be distributed by one or more distribution facilities that are similar to, but separate, from television distribution facility 208 using communications paths that are separate from communications paths 216 (e.g., using Internet paths).

Certain functions such as the user's instructions to make a change in the user's roster choices may require set-top box 218 to transmit data to television distribution facility 208 over communications paths 216. If desired, such data may be transmitted over telephone lines or other separate communications paths. If functions such as these are provided using facilities separate from television distribution facility 208, some of the communications involving set-top box 218 may be made directly with the separate facilities.

A number of suitable techniques may be used to distribute graphics and video information related to the fantasy sports contest application. For example, if each path 216 includes a number of traditional analog television channels, one or more of these channels may be used to support a number of digital channels. The bandwidth of each analog channel that is used to support digital channels may support ten or more of such digital channels. If desired, graphics and video information may be provided from server 212 or other suitable equipment at television distribution facility 208 in a continuously-looped arrangement on these digital channels. Information provided to set-top box 218 may then be used to determine which digital channels to tune to when it is time to display a desired graphic or video. Alternatively, graphics and videos may be provided on demand. With this approach, set-top box 218 and server 212 may negotiate to determine a channel on which to provide the desired graphics and videos. Videos that originate from main facility 202 or a separate facility may be distributed to user television equipment 214 using these or other suitable techniques or a combination of such techniques.

Figure 3:
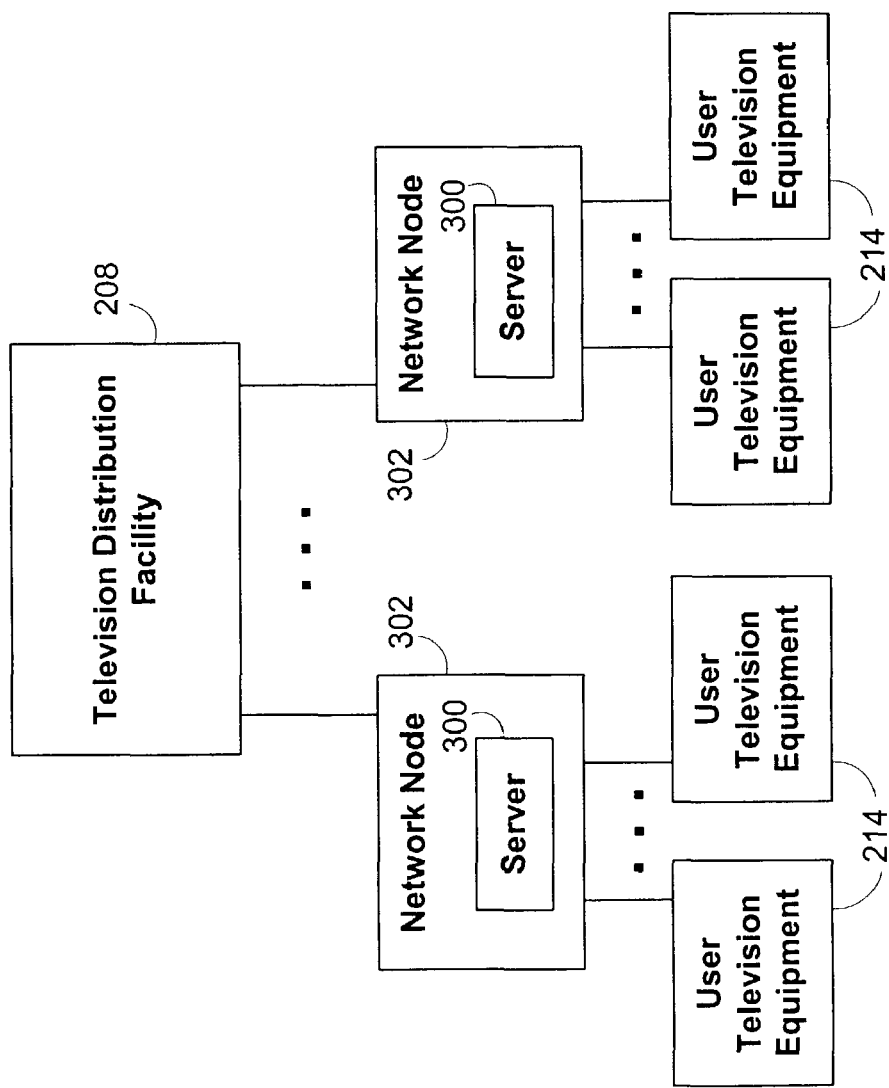
FIG. 3 is a diagram of an illustrative fantasy sports contest television system having network nodes in accordance with one embodiment of the present invention.

As shown in FIG. 3, the capabilities of server 212 at television distribution facility 208 may be distributed to servers 300 located at network nodes 302. Servers such as servers 300 may be used instead of server 212 or may be used in conjunction with a server 212 located at television distribution facility 208.

Information related to the fantasy sports contest may be downloaded periodically (e.g., once per day) to set-top box 218 of FIG. 2 and stored locally. This information may be accessed locally when needed by the fantasy sports contest application implemented (at least partially) using set-top box 218. Alternatively, this information may be provided in a continuously-looped arrangement on one or more digital channels on paths 216. With such a continuously-looped arrangement, a map indicating the location of the latest information may be downloaded periodically to set-top box 218 (e.g., once per day). This allows the content on the digital channels to be updated. The fantasy sports contest application on set-top box 218 may use the map to locate desired information on the digital channels. Another approach involves using a server such as server 212 or servers 300 (FIG. 3) to provide the information on request (e.g., after set-top box 218 has negotiated with that server to set up a download operation). For example, the server may provide instructions to set-top box 218 informing set-top box 218 where the desired information is located on a particular digital channel. The information may be updated periodically if the server that is responsible for providing the instructions for informing the set-top box of the location of the information is also updated periodically.

A cable modem may be used to distribute the fantasy sports contest application and related information. This information may also be distributed using a combination of these techniques or any other suitable technique.

Figure 4:
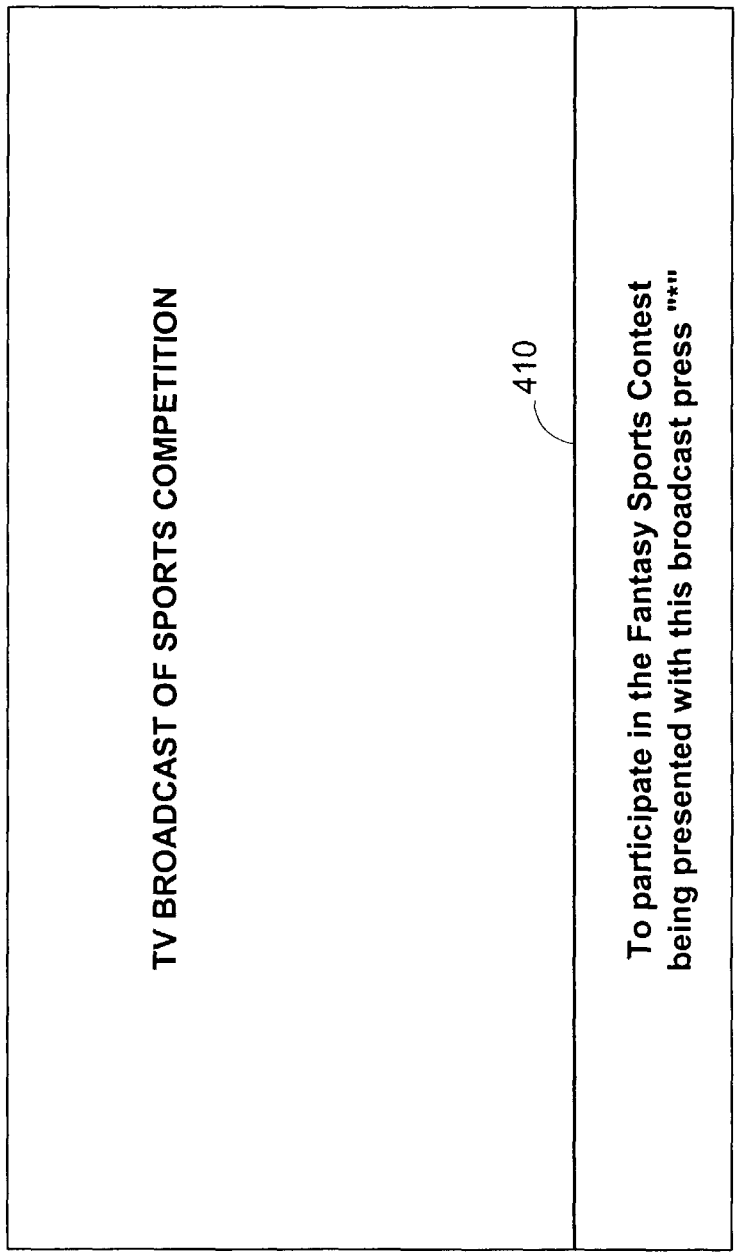
FIG. 4 is an illustrative display showing how the fantasy sports contest application may be invoked from a television broadcast display in accordance with one embodiment of the present invention.

As illustrated by FIG. 4, the fantasy sports contest application of the present invention may be invoked from a television broadcast of a sports event that has been coupled with a fantasy sports contest. The user may tune to the television channel carrying sports broadcast display 400, in which an information display 410 notifies the user of a fantasy sports contest that is available with the television broadcast. The user may then invoke the fantasy sports contest using user input equipment 112 (e.g., a remote control).

The television sports broadcast may be distributed through a distribution system substantially equivalent to that of the fantasy sports contest application and related information. The television sports broadcast may be a live or tape delayed broadcast of a competition in a team sport (e.g., football, baseball, basketball, hockey), an individual sport (e.g., tennis, golf), a sport involving animals (e.g., dog racing), or any other suitable sporting event. The television sports broadcasts may be provided by outside content providers such as television networks.

Figure 5:
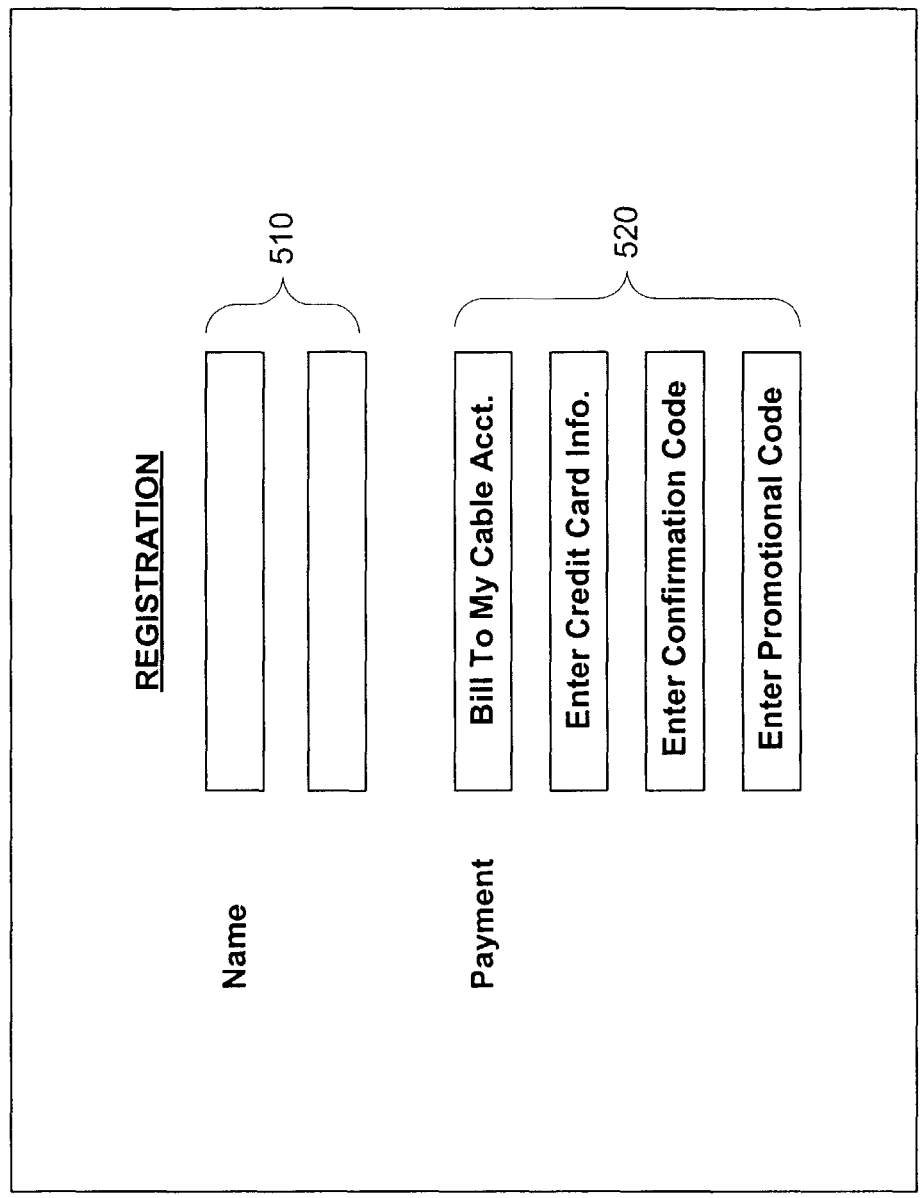
FIG. 5 is an illustrative fantasy sports contest registration screen in accordance with one embodiment of the present invention.

Entry in the fantasy sports contest may be free to users, may be purchased by users, or may be offered as a promotional offering in exchange for purchase of an advertiser's product, or a combination thereof. FIG. 5 shows an illustrative registration screen 500 that may be displayed after the fantasy sports application is invoked. Registration screen 500 may include data entry boxes 510 and selectable elements 520 for user entry of identification and payment information.

The fantasy sports contest application may assign the user to a competitive grouping in the fantasy sports contest. The fantasy sports contest application may assign the user to a competitive grouping by geographic location, experience level, a combination of these methods, or any other suitable method. The fantasy sports contest application may ascertain the user's geographic location by identifying the cable system headend used by the user. The fantasy sports contest application may assign users using a certain cable system headend to the same competitive group or groups. The fantasy sports contest application may access information on the user's prior entries in fantasy sports contests, geographic information, demographic information, and other suitable information to divide users into competitive groups. The fantasy sports contest application may use information on the user's number of entries and performance in prior fantasy sports contests to assign the user a skill level attribute. The fantasy sports contest application may divide users into competitive groups according to skill level attribute (e.g., novice, rookie, veteran, all-pro). The fantasy sports contest application may group users using both geographic location and skill level. For example, the users from a particular geographic location may be split into competitive groups according to skill level. The fantasy sports contest application may also assign users to leagues on a first come first serve basis, by randomly matching users, or by any other suitable method.

The fantasy sports contest application may enable the user to compete against a select group of other users (e.g., friends, family) in the fantasy sports contest. In one suitable arrangement, a competitive group may be established before the start of a fantasy sports contest. For example, entry into the fantasy sports contest may be purchased or otherwise obtained as a group package, where a predetermined number of users are allowed to compete in the fantasy sports contest in a pre-formed group. A confirmation code may be provided to the users, and each user in the pre-formed group may separately sign into the fantasy sports contest. For example, the confirmation code may be entered in registration screen 500. The fantasy sports contest application may enforce the predetermined number of users allowed in a group pass by denying access to users over the predetermined limit.

Figure 6:
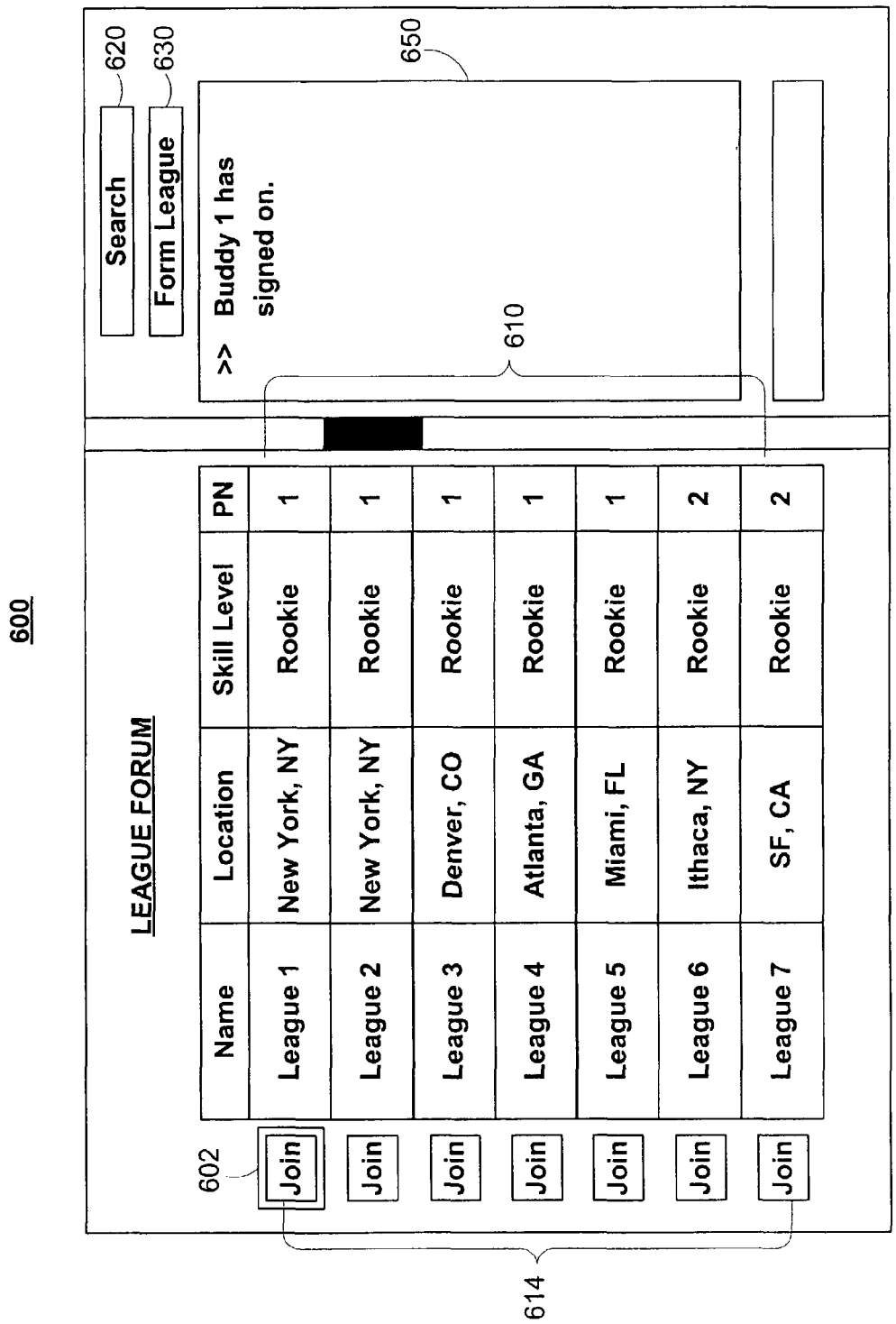
FIG. 6 is an illustrative fantasy sports contest league forum screen in accordance with one embodiment of the present invention.

The fantasy sports contest application may enable the user to instantly form a competitive group before the start of a fantasy sports contest. FIG. 6 shows illustrative league forum 600 where the user may, among other features, chat with other users, search for leagues to join, and form his own league. The fantasy sports contest application may display league forum 600 before the start of a fantasy sports contest, when the user signs into the fantasy sports contest application, or at any other suitable time. Separate league forums may exist for particular geographic locations (e.g., a New York league forum), for particular skill levels (e.g., a Rookie league forum), etc. Alternatively, a universal league forum may be available to all users of a fantasy sports contest application.

League forum 600 may include display 610 showing the competitive groups or leagues that have room for additional users. Display 610 may include, for each league, an identifying name of the league (e.g., name of the user forming the league), geographic location of the league, skill level of the league, and the number of empty slots still available in the league. The skill level displayed in display 610 may be the averaged skill level of the users currently signed up in the league, may be the desired skill level of users being sought for the league, or may be the skill level required to join the league. Selectable element 614 may be provided next to each display 610 that enables the user to join the selected league upon user selection. The user forming a league may have the power to reject any user that wishes to join the league, and may put up requirements as to the attributes of allowed users (e.g., skill level).

The fantasy sports contest application may enable the user may create the user's own league by selecting element 630 in league forum 600. FIG. 7 shows illustrative menu 700 that may be displayed to the user upon user selection of element 630. Menu 700 may enable the user to customize options concerning the new league. The user may use text entry box 702 to control the maximum number of users allowed in the league, and selection boxes 704 to implement limiting criteria on what type of user may join the league. For example, the user may use drop down boxes 706 to choose a minimum skill level of "Veteran" for those users wishing to join the league. Any users not meeting the criteria may be automatically prevented by the fantasy sports contest application from joining the league. The skill level of the user may be assigned by the fantasy sports contest application, or the user may self select his or her skill level.

Figure 8:
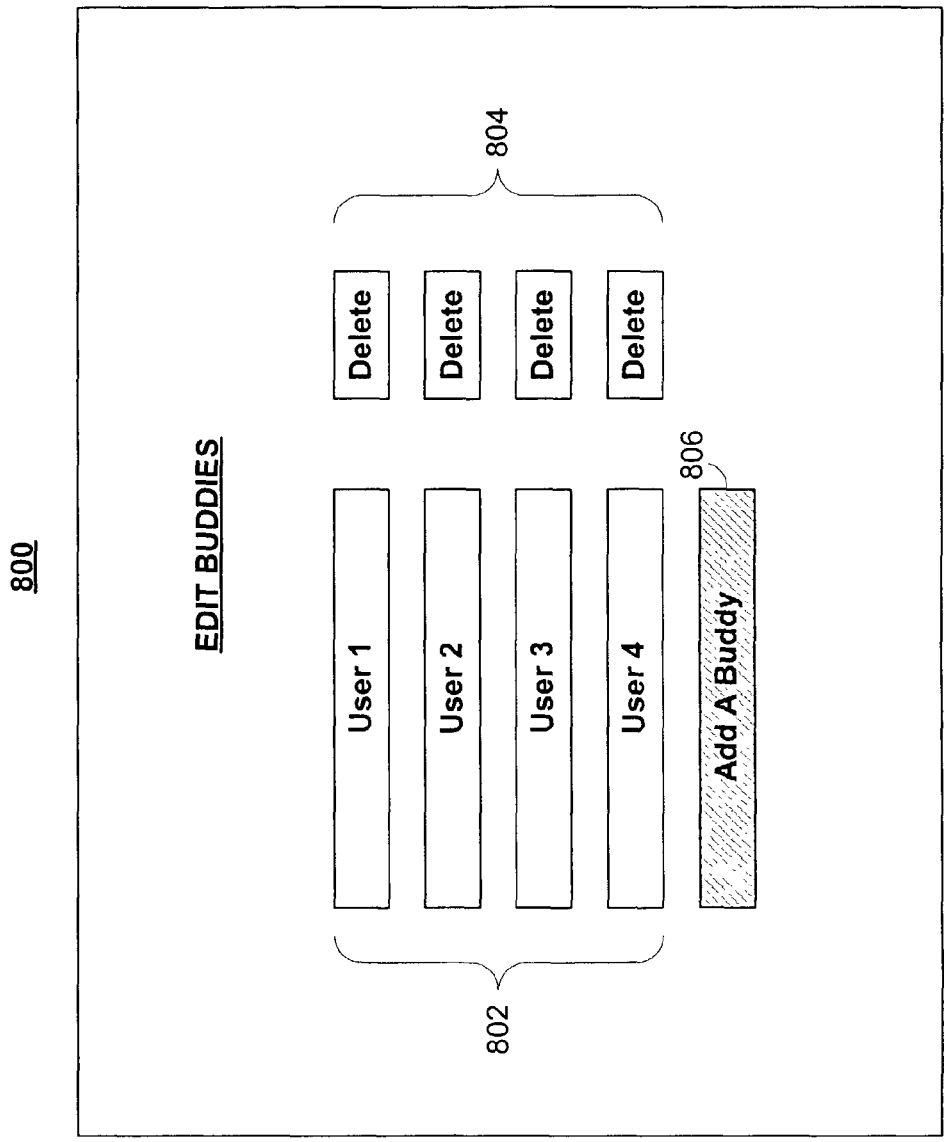
FIG. 8 is an illustrative "Buddy" selection screen in accordance with one embodiment of the present invention.

One of the criteria that the user may select in menu 700 is a "Buddies Only" criteria that allows only select users to join the league. Upon user selection of element 704 representing the "Buddies Only" criteria, the fantasy sports contest application may enable the user to enter and edit a list of privileged users that the user wishes to designate as "Buddies." As shown in FIG. 8, the user may be able to use menu 800 to enter and edit a list of select users. The user's "Buddies" may be displayed using elements 802, which may be deleted using selectable elements 804. The user may select element 806 to add a user to the list.

The fantasy sports contest application may enable the user to search through all available leagues using suitable criteria. FIG. 9 shows a search menu 900 that the fantasy sports contest application may display upon user selection of search element 620 of FIG. 6. Menu 900 may include search box 910 that allows the user to search leagues by user name, user nickname, or other user identifier. Search results may be displayed in display 610 of FIG. 6. Similarly, search boxes 920 and 930 may enable the user to search by geographic location of the league, and by skill level of the league. The fantasy sports contest application may enable the user to search using a combination of these criteria, or using other suitable criteria.

Figure 10:
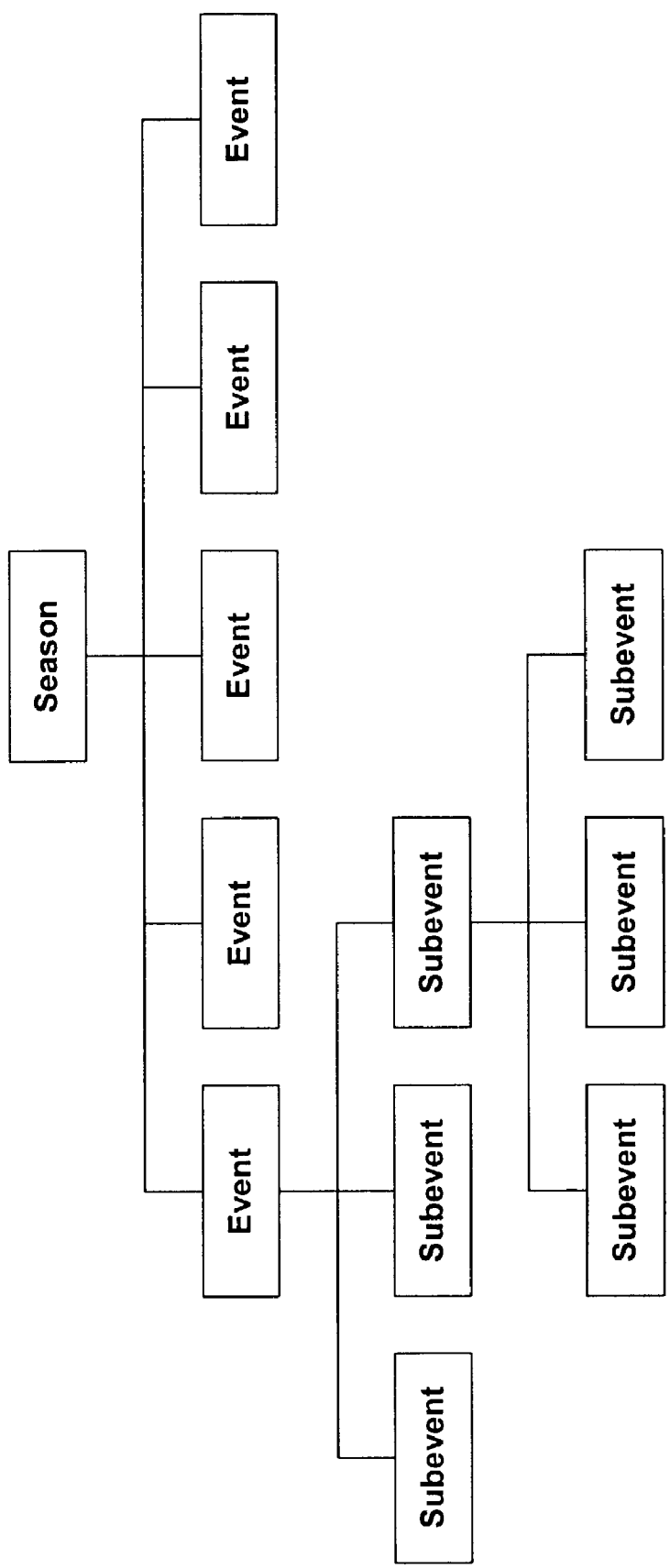
FIG. 10 is an illustration of how a sports season may be subdivided into events and subevents in accordance with one embodiment of the present invention.

A fantasy sports contest in accordance with one embodiment of the present invention is based on the real-life performance of the user's roster of athletes over a subevent of a real-life sports event. As illustrated by FIG. 10, a sports season, on which known traditional fantasy sports contests are based, may be divided into a plurality of individual sports events. In turn, each sports event may be further divided into a plurality of subevents, wherein individual subevents may be further divisible into subevents. Fantasy sports contests of the present invention may be based on subevents within individual sports events. For example, a professional golf season is made up of a number of tournaments, each tournament consisting of four rounds of competition, and each round consisting of eighteen holes of golf. Still further, each hole of golf consists of a number of strokes of play by each golfer. In this example, a single tournament may be defined as an individual sports event, and any further divisions of the tournament may be defined as subevents. Alternatively, a single round of golf may be defined as an individual sports event.

Figure 11:
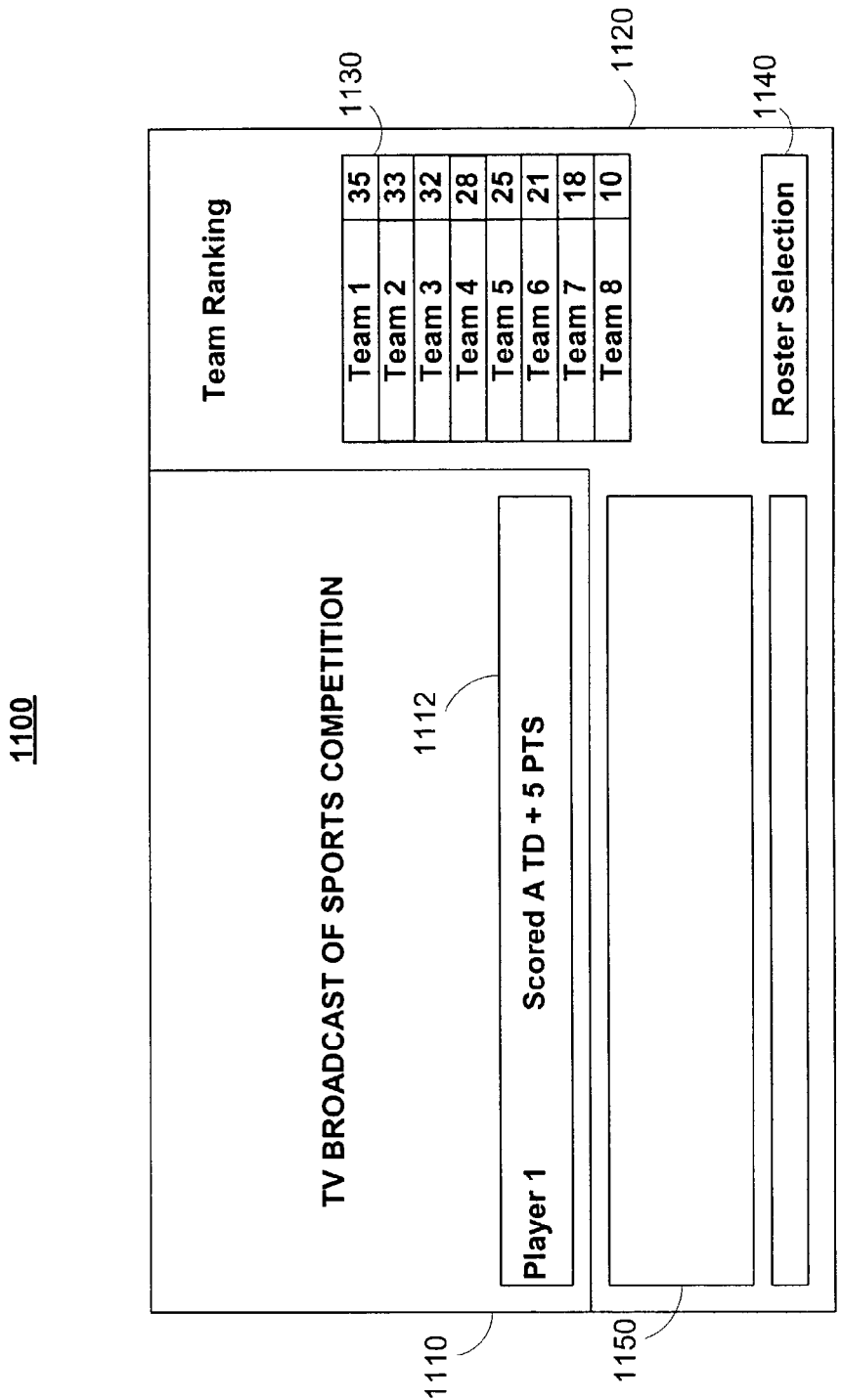
FIG. 11 is an illustrative fantasy sports contest application display provided concurrently with a related television sports broadcast in accordance with one embodiment of the present invention.

In one suitable approach, the fantasy sports contest may be presented along with a television broadcast of an associated sports event. As illustrated in FIG. 11, fantasy sports contest information region 1120 may be displayed in conjunction with television broadcast 1110. Region 1120 may include fantasy sports contest information 1130, roster selection element 1140, and instant messaging tool 1150. Fantasy sports contest information 1130 may be any information related to the fantasy sports contest, such a point ranking of the user's competitive group. Instant messaging tool 1150 may be substantially equivalent to instant messaging tool 650 of FIG. 6, and may enable the user to communicate with other users in the fantasy sports contest.

As illustrated in FIG. 11, the user may be alerted when fantasy sports contest scoring occurs in the real-life action depicted by television broadcast 1110. For example, an athlete on the user's fantasy sports contest team roster may score fantasy points by performing actions worthy of reward under the rules of the fantasy sports contest. Scoring alert bar 1112 may be displayed upon the scoring of fantasy points that may include information such as the name of the athlete, a description of the action that resulted in the scoring of fantasy points, and the number of fantasy points scored.

Figure 12:
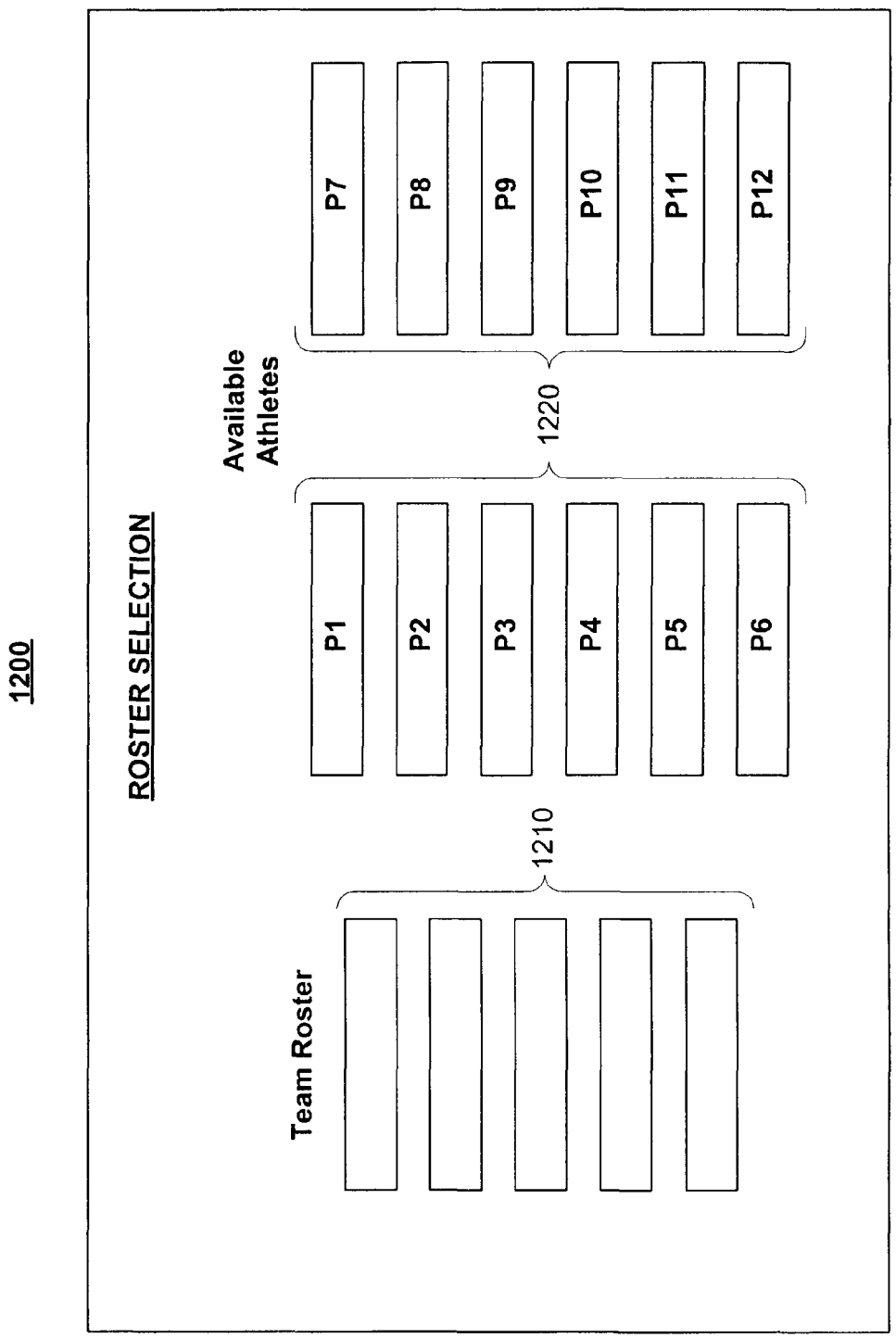
FIG. 12 is an illustrative roster selection screen that may be used to select and alter the user's fantasy sports contest team roster in accordance with one embodiment of the present invention.

FIG. 12 shows illustrative roster selection screen 1200 that may be displayed by the fantasy sports contest application upon user selection of element 1140 in FIG. 11. Screen 1200 may enable the user to choose and alter the user's fantasy sports contest team roster by placing available athletes, represented by elements 1220, into team roster spots 1210. The athletes available for selection may be limited to those athletes competing in the televised sports event. Roster selection screen 1200 may be displayed to the user before the start of a fantasy sports contest to prompt initial selection of the user's roster, and may be accessed by the user at any point during the fantasy sports contest to alter the user's roster.

Figure 13:
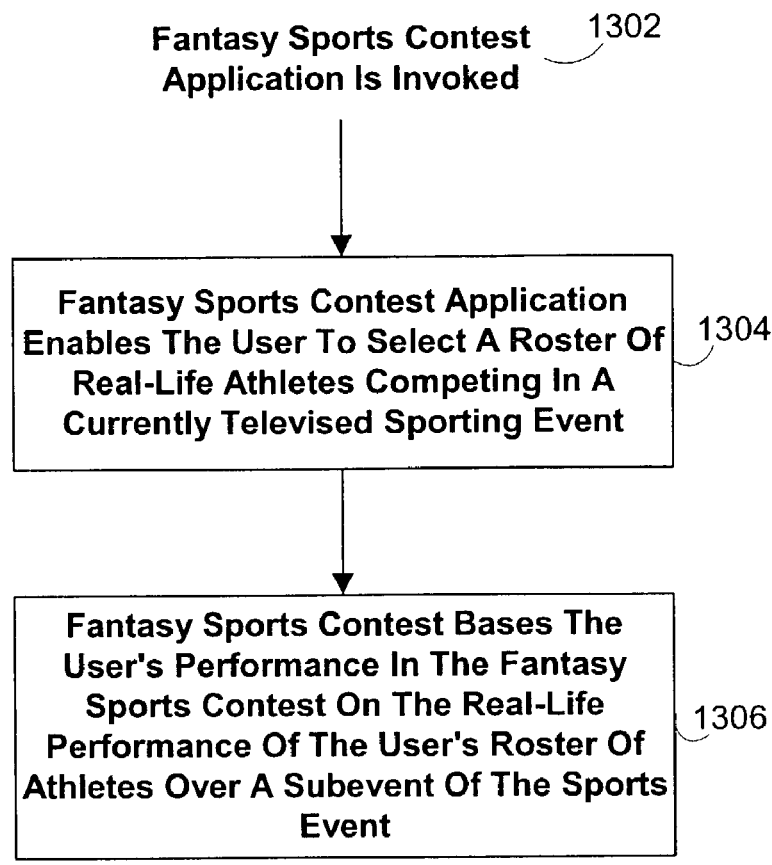
FIG. 13 is flow chart of illustrative steps for providing a fantasy sports contest based on a subevent in accordance with one embodiment of the present invention.

FIG. 13 is a flow chart of illustrative steps for providing a fantasy sports contest based on the performance of a roster of athletes over a subevent of a real-life sports event. At step 1302, the fantasy sports contest application is invoked. At step 1304, the fantasy sports contest application enables the user to select a roster of real-life athletes that are competing in the currently televised sports event. The fantasy sports contest application then scores the user's performance in the fantasy sports contest based on the real-life performance of the user's roster of athletes over a subevent of the sports event (step 1306).

In one suitable approach, the fantasy sports contest application may provide the user with fantasy sports contests having staggered start times. For example, the user tuning into a fantasy sports contest enabled television broadcast may not wish to wait until the end of the current subevent based fantasy sports contest to begin competing. In one suitable arrangement, the fantasy sports contest application may create fantasy sports contests at predetermined intervals by grouping together users that indicated a desire to enter the fantasy sports contest during the predetermined interval. For example, the fantasy sports contest application may start a fantasy sports contest based on a subevent, (e.g., the next ten minutes of competition, or the rest of the sports event) every fifteen seconds, where the users who indicated a desire to join within the past fifteen seconds are grouped together for competition in the new fantasy sports contest.

Figure 14:
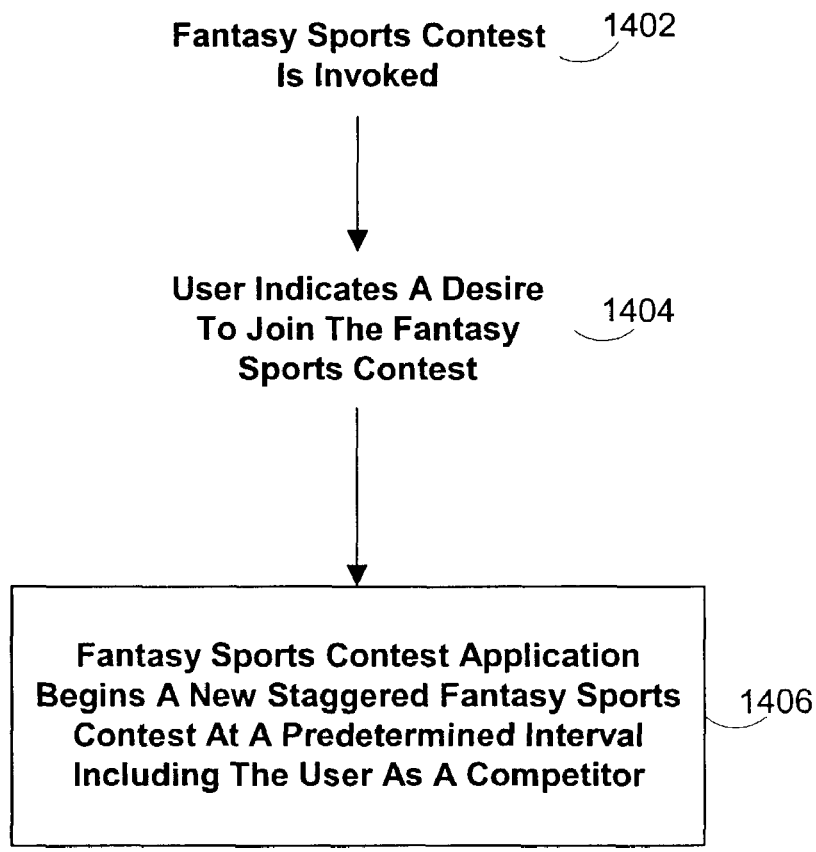
FIG. 14 is flow chart of illustrative steps for providing staggered start fantasy sports contests based on subevents in accordance with one embodiment of the present invention.

FIG. 14 is a flow chart of illustrative steps for providing staggered start fantasy sports contests. At step 1402, the fantasy sports contest application is invoked. The user indicates a desire to join the fantasy sports contest (step 1404). The fantasy sports contest application begins a new staggered fantasy sports contest at a predetermined interval including the user as a competitor.

In one suitable approach, the fantasy sports contest application may instantaneously begin a fantasy sports contest upon the user indicating a desire to compete. In one suitable arrangement, the fantasy sports contest application may instantaneously start a fantasy sports contest based on reaching preset score levels, which may represent levels of prizes being offered in the fantasy sports contest. By allowing the user to compete against score levels, the fantasy sports contest application enables instant user participation in the fantasy sports contest. Alternatively, the fantasy sports contest application may instantly begin a fantasy sports contest by grouping together other users that indicate a desire to compete at a time substantially instantaneous to the user.

Figure 15:
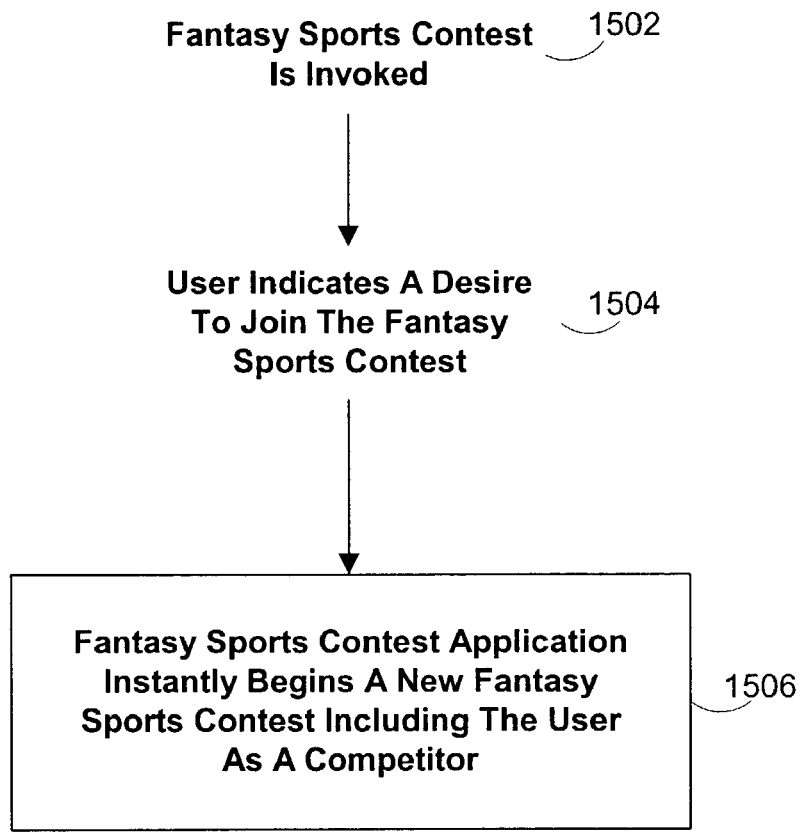
FIG. 15 is flow chart of illustrative steps for providing an instant start fantasy sports contest based on a subevent in accordance with one embodiment of the present invention.

FIG. 15 is a flow chart of illustrative steps for providing instant start fantasy sports contests. At step 1502, the fantasy sports contest application is invoked. The user indicates a desire to join the fantasy sports contest (step 1504). The fantasy sports contest application instantly begins a new fantasy sports contest including the user as a competitor (step 1506).

Figure 16:
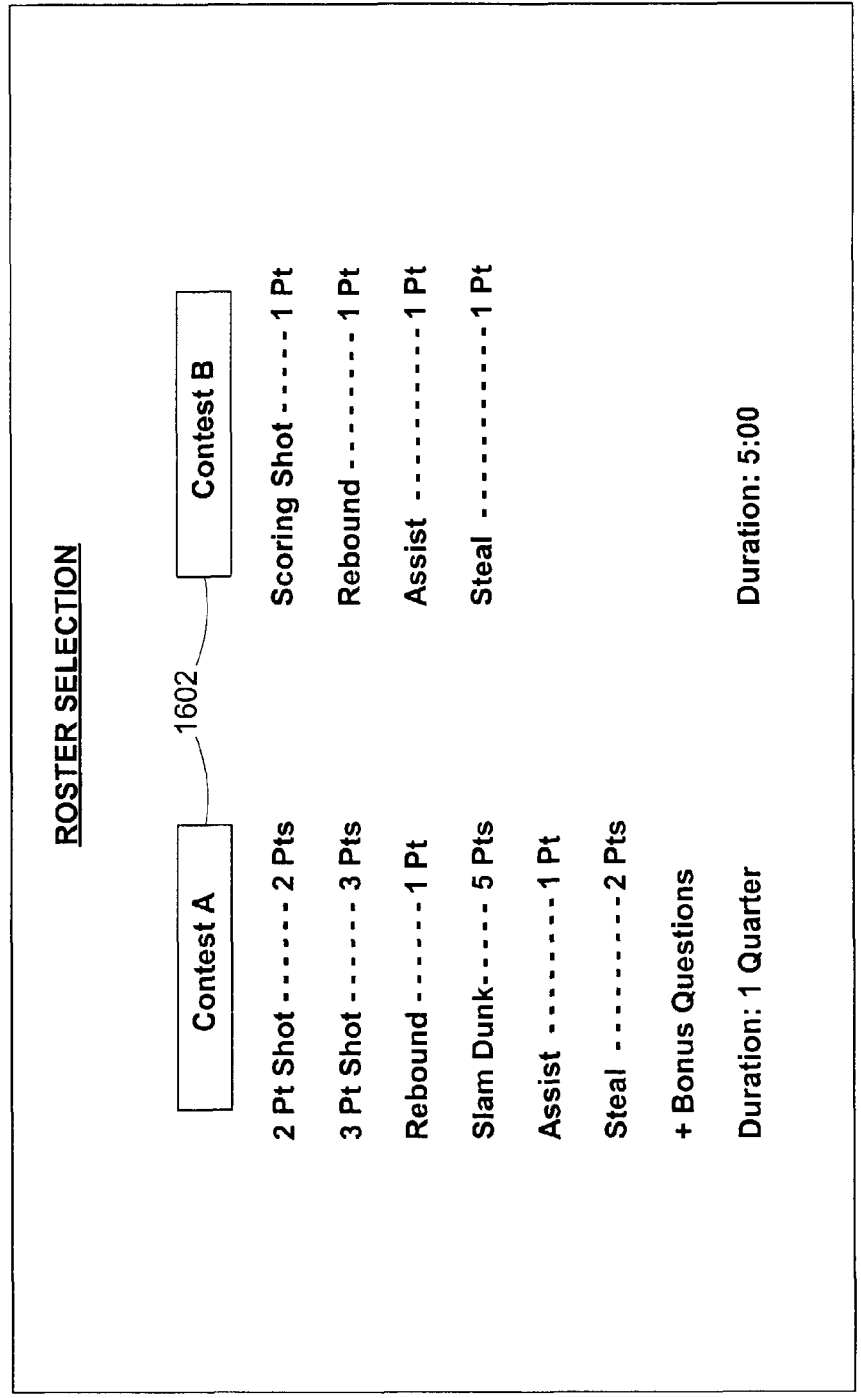
FIG. 16 is an illustrative menu for user selection between multiple fantasy sports contests in accordance with one embodiment of the present invention.

In one suitable approach illustrated by FIG. 16, the fantasy sports contest application may simultaneously implement multiple fantasy sports contests having different themes and scoring rules based on the same televised sports event. For example, the fantasy sports contest application may simultaneously present multiple fantasy basketball contests, each having different rules for converting real-life action to fantasy points, for the same real-life basketball contest. As shown in FIG. 16, the fantasy sports contest application may display menu 1600 upon the fantasy sports contest application being invoked that enables the user to choose a favored fantasy sports contest to join from among available selections 1602. Menu 1600 may also include summaries of the available selections that may include themes, scoring rules, duration, and other suitable information on the selections.

Figure 17:
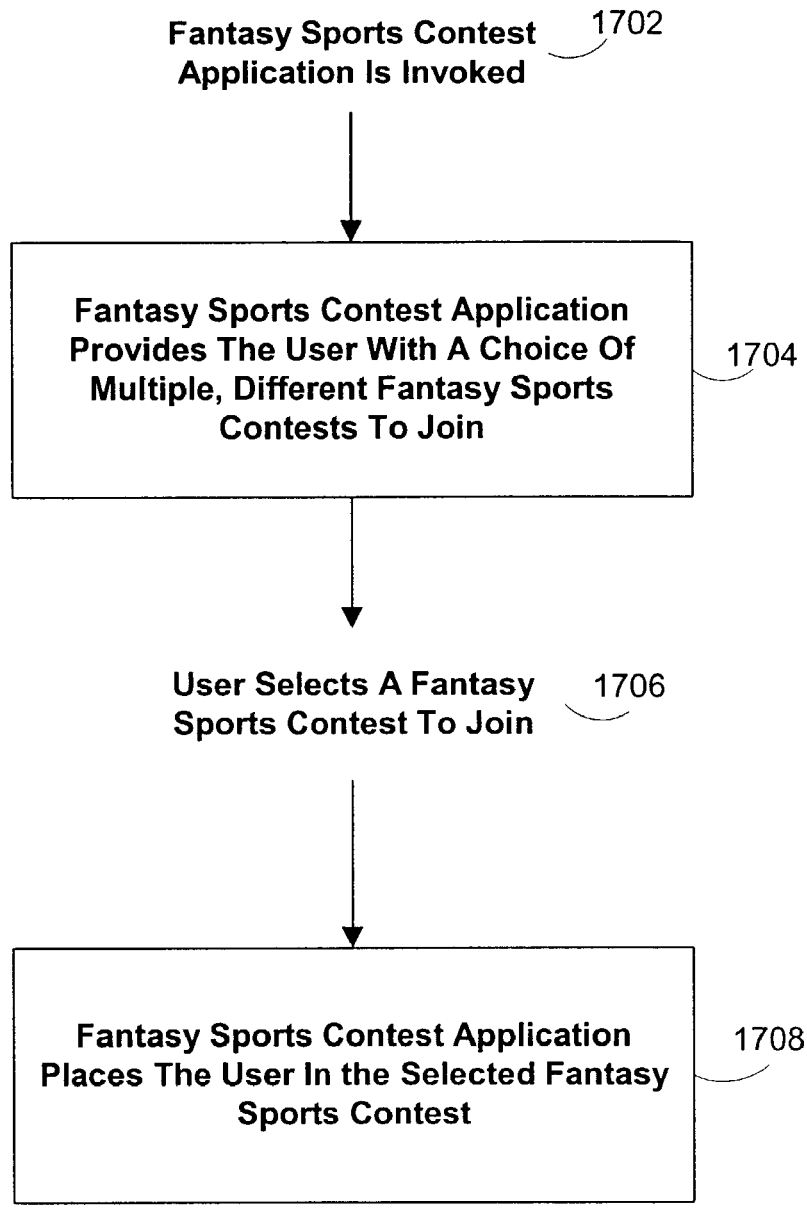
FIG. 17 is flow chart of illustrative steps for enabling the user to choose between multiple, different fantasy sports contests in accordance with one embodiment of the present invention.

FIG. 17 is a flow chart of illustrative steps for simultaneously providing multiple, different fantasy sports contests based on the same televised sports contest. At step 1702, the fantasy sports contest application is invoked. At step 1704, the fantasy sports contest application enables the user to select between multiple, different fantasy sports contests based on the same televised sports contest. User selects a fantasy sports contest (step 1706), and the fantasy sports contest application places the user in the selected fantasy sports contest (step 1708).

In one suitable approach, the fantasy sports contest application may divide a fantasy sports contest into subcontests. For example, fantasy basketball contest application may divide a fantasy basketball contest into subcontests on three point shots, on rebounds, on field goal percentage, on assists, etc. The user's fantasy sports contest team roster may be scored based on each individual subcontest to determine whether the user has won any of the subcontests. In one suitable arrangement, the user may be automatically entered in the subcontests when competing in the main fantasy sports contest. In one suitable arrangement, the user may choose to compete in the main fantasy sports contest, any subcontests, or any combination thereof.

Figure 18:
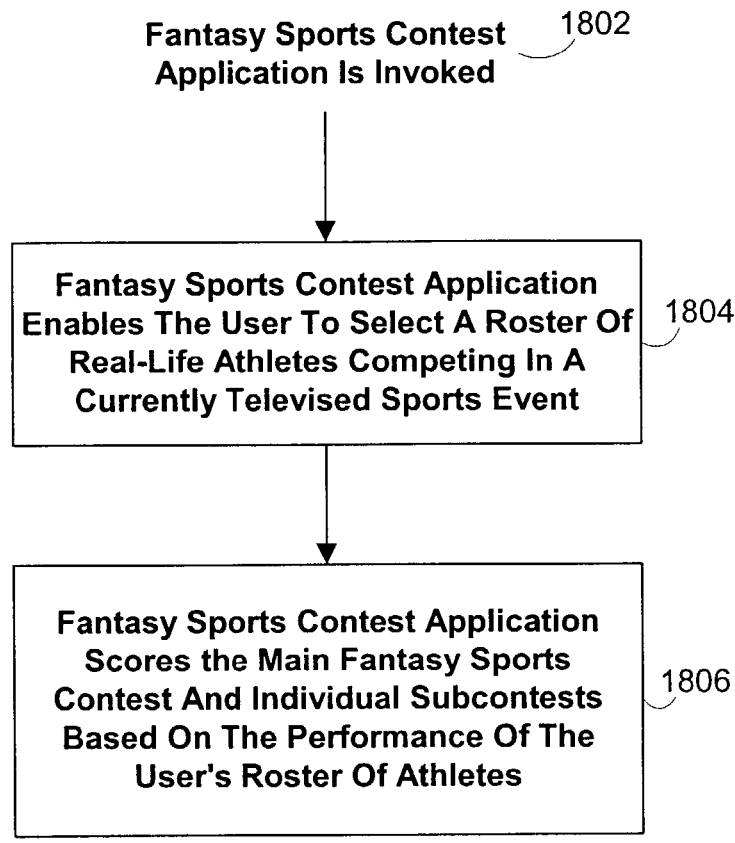
FIG. 18 is flow chart of illustrative steps for providing a main fantasy sports contest and multiple subcontests in accordance with one embodiment of the present invention.

FIG. 18 is a flow chart of illustrative steps for providing subcontests within a main fantasy sports contest. At step 1802, the fantasy sports contest is invoked. The fantasy sports contest application enables the user to select a roster of real-life athletes competing in a currently televised sports event (step 1804). The fantasy sports contest application scores the main fantasy sports contest and individual subcontests based on the real-life performance of the user's roster of athletes (step 1806).

In one embodiment of the present invention, the fantasy sports contest application may implement fantasy sports contests that pose to the user bonus questions. In one suitable approach, the fantasy sports contest may pose bonus questions asking the user for predictions on the outcomes real-life action occurring during subevents of the sports event. For example, a fantasy sports contest may query the user on whether a certain basketball team will score (e.g., either fantasy or real-life points) in the next two minutes of the contest, whether a golfer will hit into the water on the next stroke, whether a football team will lead after the next quarter of play, etc. A correct answer may earn the user fantasy points, whereas an incorrect answer may earn no points, or may result in the deduction of points.

Figure 19:
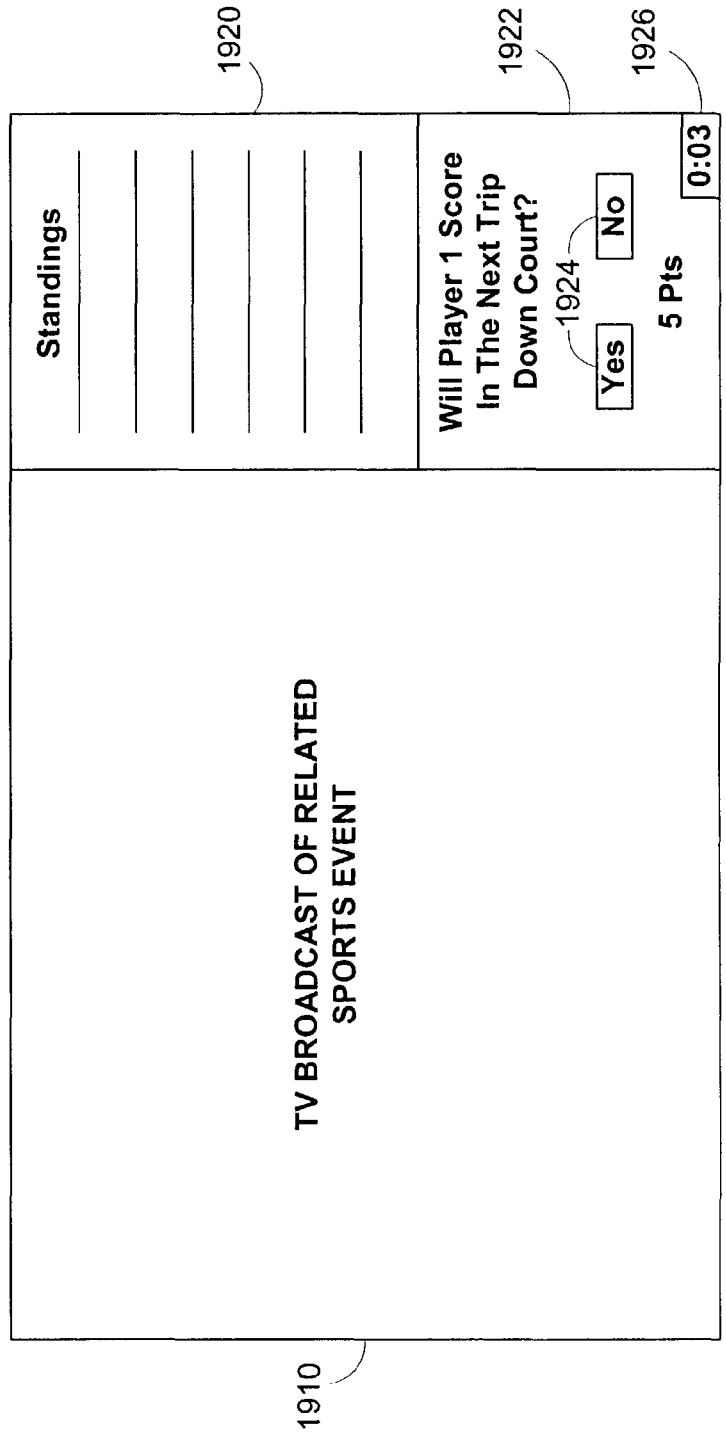
FIG. 19 is an illustrative display screen showing how bonus questions may be presented to the user in accordance with one embodiment of the present invention.

As illustrated in FIG. 19, an illustrative display screen of a fantasy sports contest involving bonus questions may include broadcast 1910 of a related sports event, and fantasy sports contest information region 1920. Bonus questions may be displayed to the user in display region 1922 of region 1920, which may also include other relevant fantasy sports contest information. Display region 1922 may display the bonus question and the number of fantasy points being awarded for a correct prediction. Selectable elements 1924 may be provided in region 1922 to enable the user to lock in an answer to the bonus question being posed. Multiple bonus questions may be pending at any one time during the fantasy sports contest. For example, a bonus question may be presented at the beginning of the contest asking for a prediction on which team will be leading in the real-life contest at the end of the first five minutes of play, while another question may be posed two minute into the fantasy sports contest asking for a prediction on who will score the next time down the court. Accordingly, each bonus question is posed to the user and an answer is recorded within a predetermined time frame. The bonus question then comes to maturation at some point during the fantasy sports contest (e.g., at the five minute mark, or after the next trip down court) and fantasy points may be awarded, not awarded, or deducted depending on the answers supplied by the user. The fantasy sports contest application may require the user to answer the bonus question within a predetermined time frame. All answers given after the provided time frame may be disregarded. Display 1922 may include timer 1926 that informs the user of how much time remains before an answer to the bonus question is required.

It should be understood that although the subject of the bonus questions in this approach may be subevents, a fantasy sports contest involving bonus questions is not limited to a contest based on a segment of a sports event (e.g., a subevent) and may be a traditional fantasy sports contest (e.g., a fantasy sports contest based on an entire season).

Alternatively, the bonus questions may not be based on subevents, and may be trivia questions or other types of challenges that may be related to the theme of a television broadcast being shown or the athletes on the user's fantasy sports contest roster.

In one suitable arrangement, bonus questions may be used to supplement fantasy scoring by the user's fantasy sports contest team roster. In this case, the bonus questions posed to the user may be, at least partially, based on the athletes on the user's fantasy sports contest team roster. For example, if the user's fantasy sports contest roster includes a particularly athlete, the fantasy sports contest application may query the user with trivia questions or other challenges having that particular athlete as a theme. Alternatively, the bonus questions may be scored independently as a separate interactive sports contest that is kept separate from the regular fantasy sports contest scoring.

Figure 20:
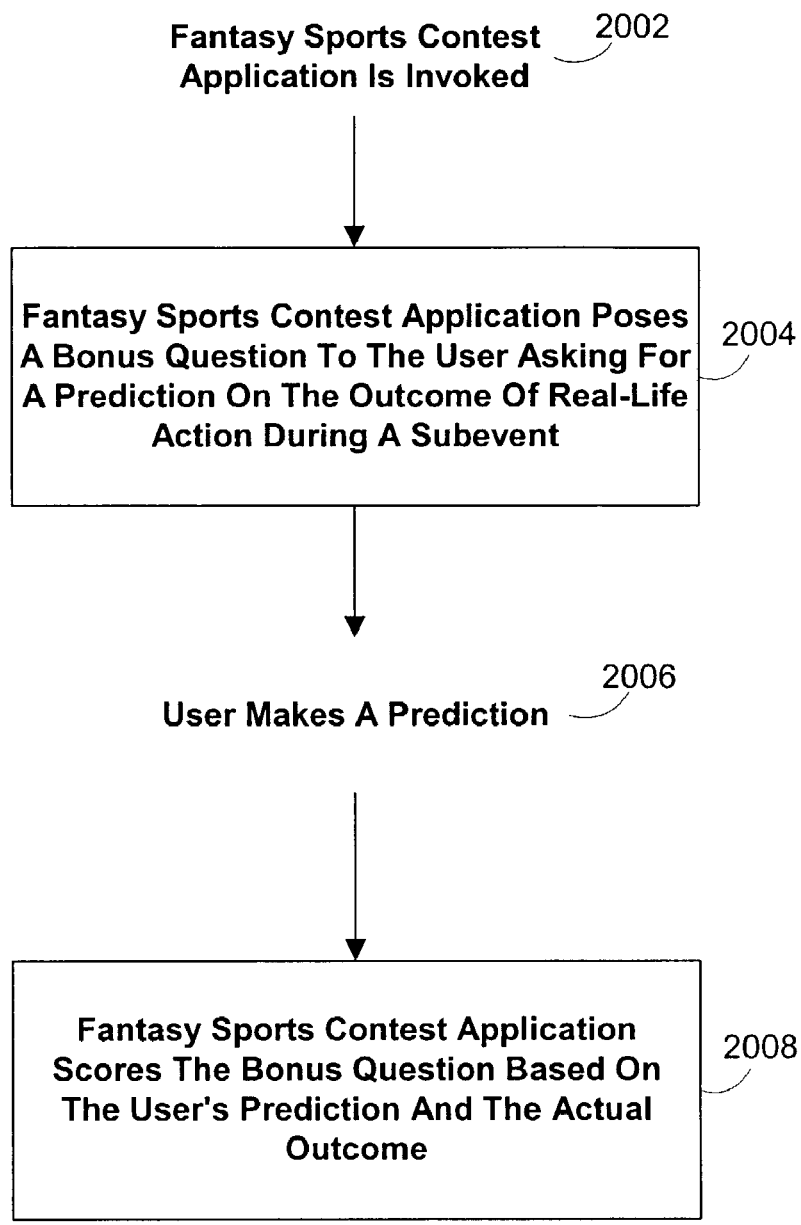
FIG. 20 is flow chart of illustrative steps for providing bonus questions based on subevents in accordance with one embodiment of the present invention.

FIG. 20 is a flow chart of illustrative steps for providing bonus questions based on subevents with a fantasy sports contest application. At step 2002, the fantasy sports contest application is invoked. The fantasy sports contest application poses a bonus question to the user asking for a prediction on the outcome of real-life action during a subevent (step 2004). The user makes a prediction on the outcome (step 2006). The fantasy sports contest application scores the bonus question based on the user's prediction and the actual outcome (step 2008).

In one embodiment of the present invention, the fantasy sports contest application may enable the user to instantly create a fantasy sports contest based on subevents with a select group of other users. The user being able to set the rules and duration of the fantasy sports contest. For example, the user watching a basketball contest may instantly create a fantasy basketball contest based on rebounds and assists for the next five minutes of play. The user may be able to assign desired point values to be awarded for each rebound and each assist, and may designate the duration of the subevent over which the fantasy sports contest will occur. The user may propose the user created fantasy sports contest to select other users, who may elect to participate in the fantasy sports contest. These users may then choose rosters of athletes to compete in the user created fantasy sports contest.

Figure 21:
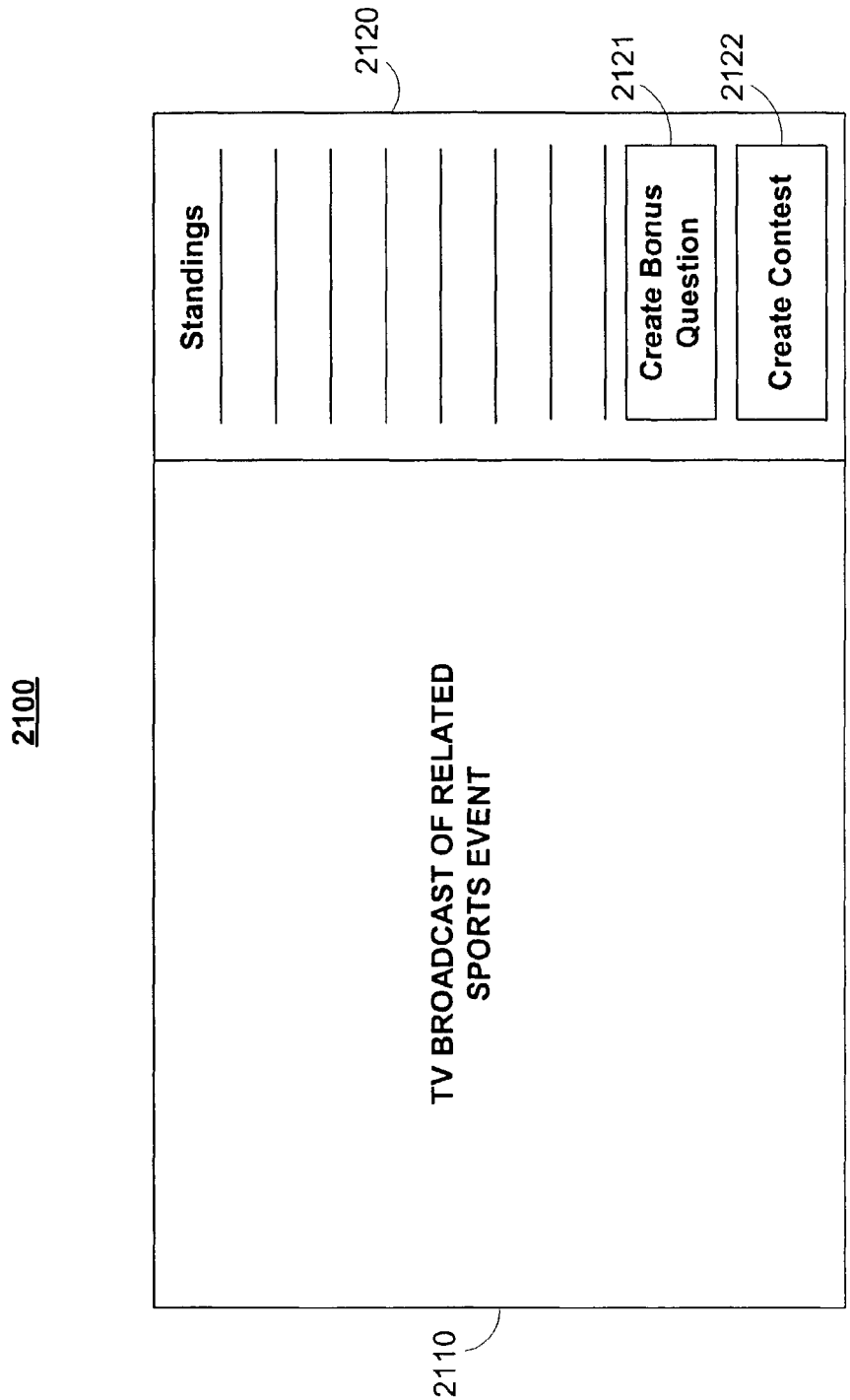
FIG. 21 is an illustrative display screen showing how the user may be able to access user customized fantasy sports contests and bonus questions in accordance with one embodiment of the present invention.

FIG. 21 shows an illustrative display screen including television broadcast 2110 of a related sports event, and fantasy sports contest information region 2120. Fantasy sports contest information region 2120 may include "Create Contest" selectable element 2122 for creating a user customized fantasy sports contest based on subevents. As illustrated by FIG. 22, user selection of element 2122 may cause the fantasy sports contest application to display contest edit menu 2200. Menu 2200 may enable the user to edit the types of plays to be awarded fantasy points, as well as how many points should be awarded for each type of play. The user may use selection boxes 2202 to select the types of plays to be awarded fantasy points, such as three point shots in a basketball game. The user may use text entry boxes 2204 to customize how many points should be awarded for each type of play. Drop down menu 2210 may enable the user to designate the duration (e.g., the subevent) over which the fantasy sports contest will take place. User selection of send element 2206 may send the user created fantasy sports contest to the users designated in a "Buddies" list, which may be substantially equivalent to the "Buddies" selected in menu 810 of FIG. 8. The user may use menu 2200 to create multiple fantasy sports contests based on the same televised sports contest, which may run, at least in part, concurrently with each other.

Figure 23:
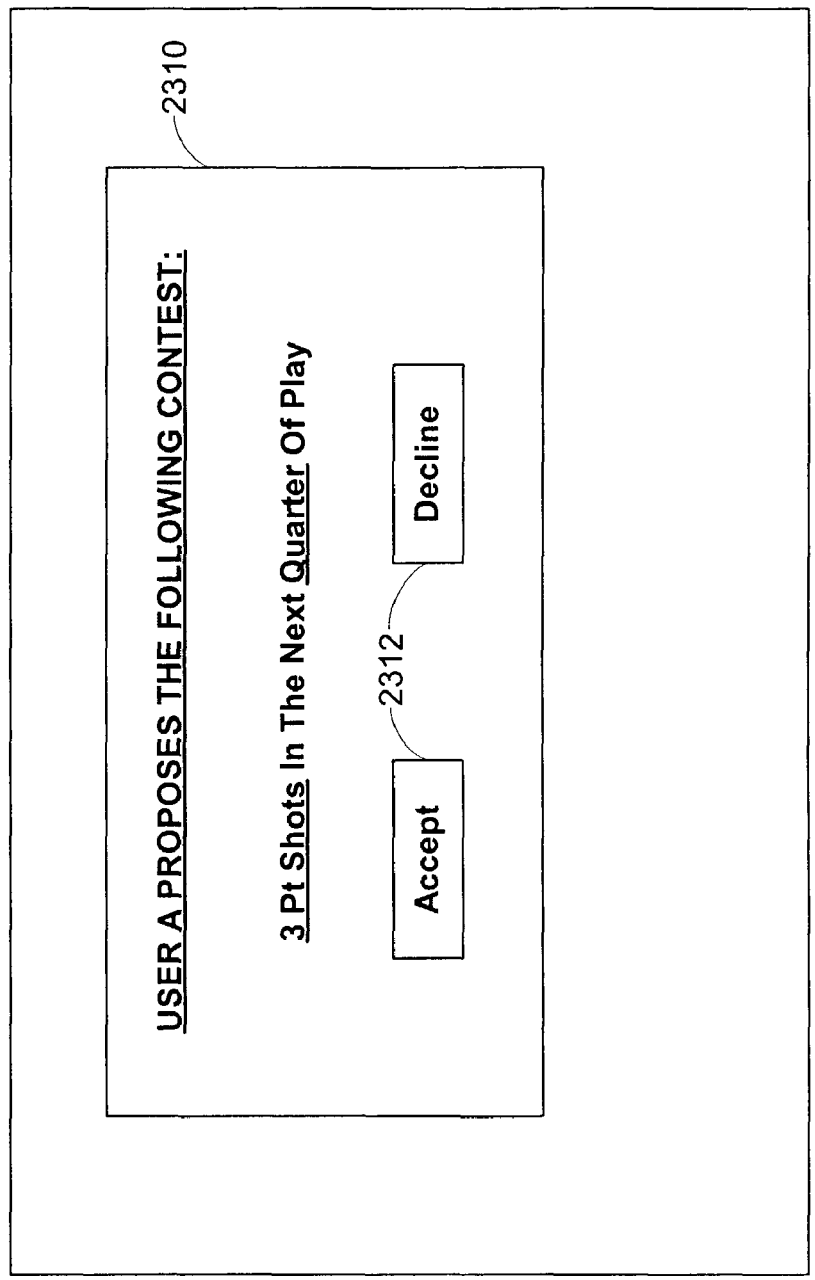
FIG. 23 is an illustrative display screen showing how a proposed fantasy sports contest may be presented to the user in accordance with one embodiment of the present invention.

As illustrated in FIG. 23, the fantasy sports contest application may alert the users receiving the proposed fantasy sports contest by displaying message 2310. Message 2310 may include the details of the proposed fantasy sports contest and selectable elements 2312 for accepting or declining the proposed fantasy sports contest. The fantasy sports contest application may enter the accepting users into the proposed fantasy sports contest over the prescribed duration or subevent. The fantasy sports contest may display to the accepting users a roster selection screen substantially equivalent to that of FIG. 12 to enable the users to select a roster for competition in the user created fantasy sports contest.

Figure 24:
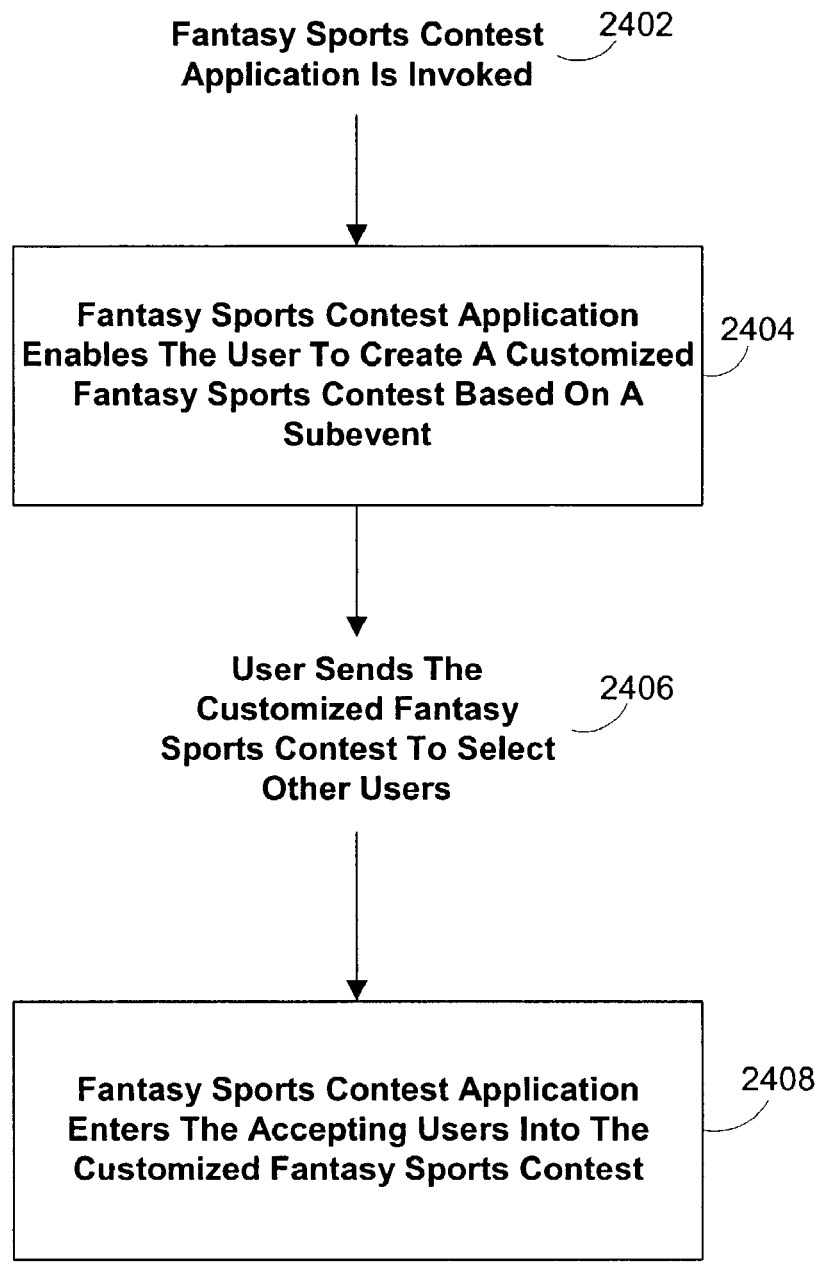
FIG. 24 is flow chart of illustrative steps for enabling the user to create a customized fantasy sports contest based on a subevent in accordance with one embodiment of the present invention.

FIG. 24 is a flow chart of illustrative steps for enabling the user to create customized fantasy sports contests. At step 2402, the fantasy sports contest application is invoked. The fantasy sports contest application enables the user to customize a fantasy sports contest based on a subevent (step 2404). The user sends the customized fantasy sports contest to select other users (step 2406). The fantasy sports contest application enters the accepting users into the customized fantasy sports contest (step 2408).

Figure 25:
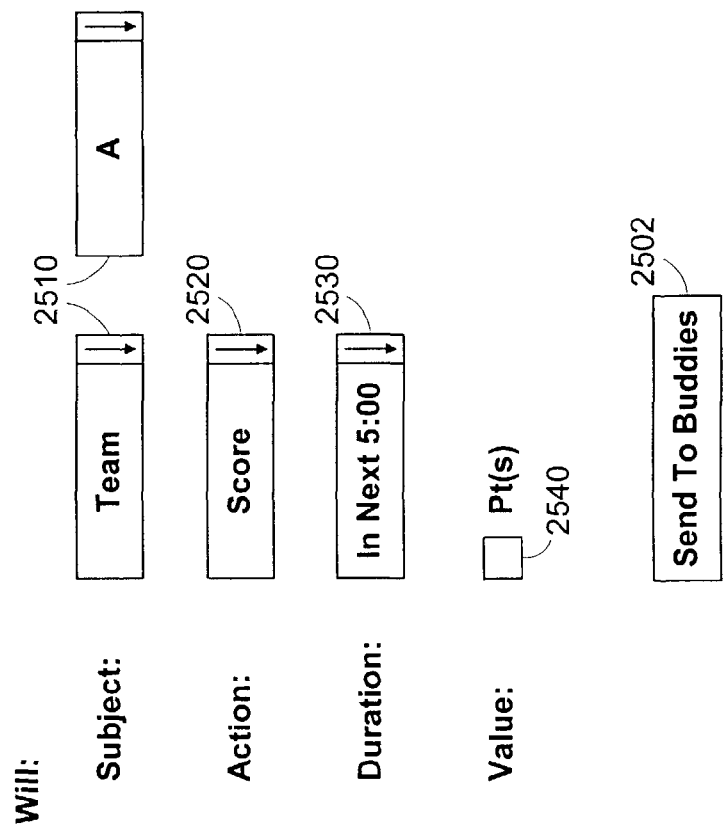
FIG. 25 is an illustrative display screen showing how the user may create a customized bonus question in accordance with one embodiment of the present invention.

In one suitable arrangement, the fantasy sports contest application may enable the user to propose bonus questions to other users asking for a prediction on the outcome of real-life action during a subevent. As shown in FIG. 21, the fantasy sports contest application may provide the user with "Create Bonus Question" element 2124. User selection of element 2124 may cause the fantasy sports contest application to display menu 2500 as shown in FIG. 25. Within menu 2500, the user may use drop down menu 2510 to select a subject for the bonus question, such as a team or an athlete competing in a televised sports event. The user may use drop down menu 2220 to select an action to be predicted in the bonus question, such as whether a subject will score (e.g., real-life or fantasy scoring), whether a subject will perform a certain type of play (e.g., hit a home run), whether a subject will be in the lead in the sports event, etc. The user may use drop down menu 2530 to select the duration or subevent over which the prediction is to be made. The user may also stipulate the value of the bonus question using text entry box 2540. User selection of send element 2502 may send the bonus question to one or more select users on a "Buddies" list substantially equivalent to the list created in menu 810 of FIG. 8. The user created bonus question may be displayed to the selected users as well as the originating user in a manner substantially equivalent to that of display 1922 in FIG. 19, and the bonus questions may function in a manner substantially equivalent to previously described bonus questions.

Figure 26:
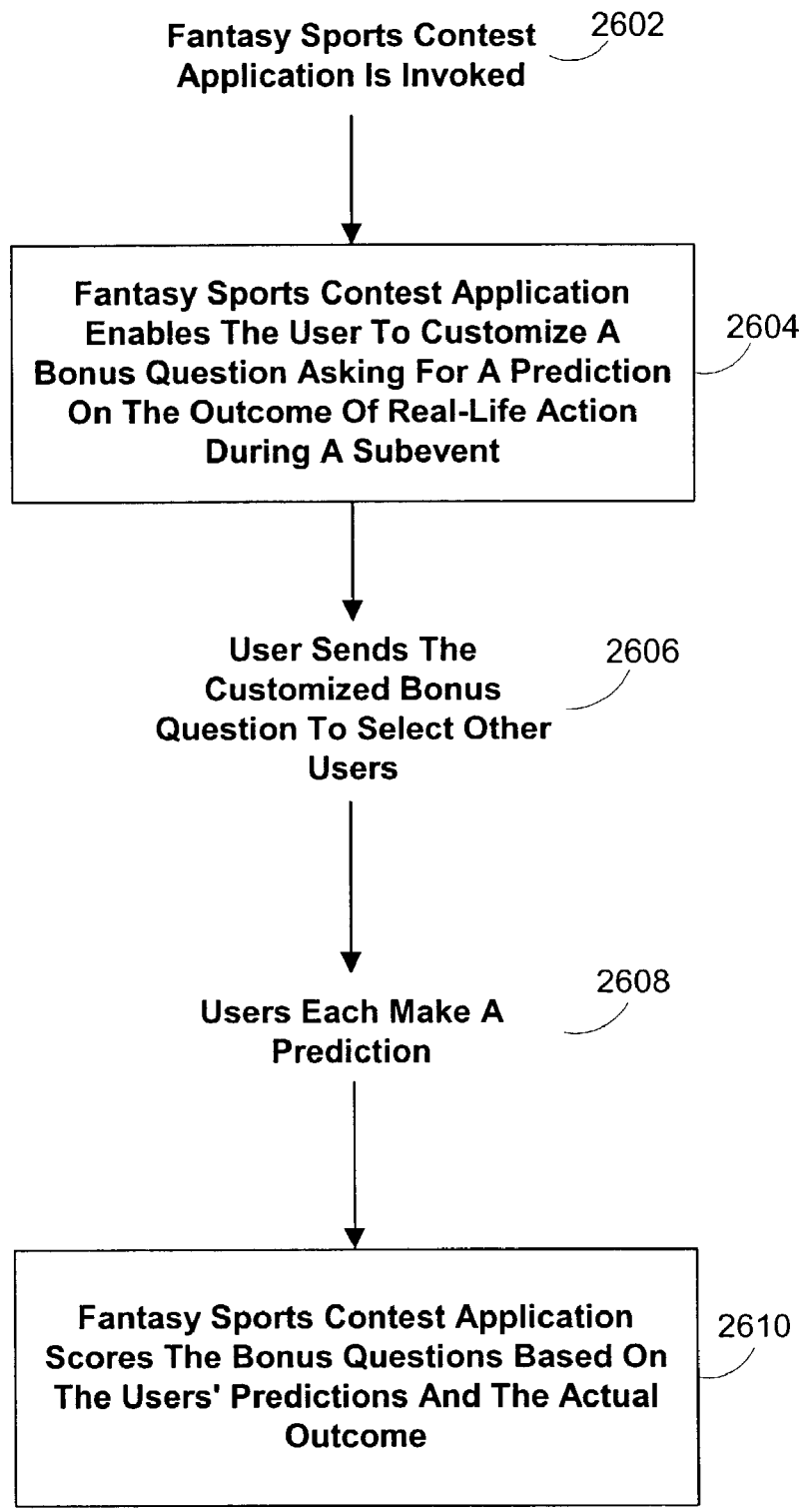
FIG. 26 is flow chart of illustrative steps for enabling the user to create a customized bonus question based on a subevent in accordance with one embodiment of the present invention.

FIG. 26 is a flow chart of illustrative steps for enabling the user to propose customized bonus questions to select other users. At step 2602, the fantasy sports contest application is invoked. The fantasy sports contest application enables the user to customize a bonus question asking for a prediction on the outcome of real-life action during a subevent (step 2604). The user sends the customized bonus question to select other users, as well as the originating user (step 2606). The users each make a prediction on the outcome (step 2608). The fantasy sports contest application scores the bonus questions based on the users' predictions and the actual outcome (step 2610).

In one embodiment of the present invention, a local provider (e.g., a local cable system operator) may create a local fantasy sports contest based on a television broadcast being shown locally. For example, the YES Network™ may provide a fantasy sports contest to users in its operating area based on televised New York Yankees™ baseball contests. The fantasy sports contest may enable the user to select a roster of athletes from the Yankees™ baseball team, and may base the user's performance in the fantasy sports contest based on the roster's performance in subevents of Yankees™ baseball games (e.g., three innings of a game). The fantasy sports contest application may provide bonus questions based on predicting the outcome of real-life action during a subevent (e.g., predicting whether a batter will make an out or reach base). The fantasy sports contest application may also provide bonus questions that focus on the Yankees™ theme, or that are related to the Yankees™ athletes on the user's roster.

In one embodiment, the fantasy sports contest application of the present invention may implement a fantasy sports contest based on subevents that involves more than one sports event. In one suitable approach, the fantasy sports contest may involve a series of sports events over a period of time (e.g., a weekend). For example, the fantasy sports contest may combine the fantasy points earned by the user during each of multiple sports events to arrive at a final tally. In one suitable arrangement, the fantasy sports contest may weight the fantasy points earned by the user during each of the multiple sports events to emphasize the value of one or more of the sports events. In one suitable arrangement, the fantasy sports contest may be sponsored by a single television network, and may involve a series of sports events being televised on the network over a period of time. The multiple sports events involved in the fantasy sports contest may be mixed. For example, a boxing match may be combined with a football game and a basketball game. Alternatively, the multiple sports contests may be carried by multiple television networks, and may involve the same sport (e.g., a series of basketball games).

In one embodiment, the fantasy sports contest of the present invention may be used to implement a fantasy sports contest based on subevents that allows the user to interact with the real-life action of sports event being televised. In one suitable approach, the fantasy sports contest application may enable the user to select a roster of athletes from those competing in the televised sports event. The user may then simulate the real-life action in the sports event involving those athletes to earn contest points. In one example, the user of a fantasy baseball contest according to this embodiment of the present invention may select a roster of players competing in a televised baseball contest. When a player on the user's roster comes up to bat (or in another embodiment, whenever a player comes up to the plate), the user may be able to use an electronic sports game interface to virtually try to swing at a pitch. For example, depending on when the user "swings," the ball may be fouled off, hit on the field of play, hit for a home run, or missed. The system may use a button on a conventional remote control as the means for the user to indicate when he or she wishes to swing. In one suitable arrangement, the fantasy sports contest may incorporate the performance of the user in the simulation game in addition to the regular scoring of the fantasy sports contest based on subevents. Alternatively, the scoring derived from the simulation game may be kept separate from the regular fantasy scoring.

In one embodiment, the present invention may be applied to a non-sports setting. For example, the present invention may be applied to a fantasy contest relating to the Academy Awards™, (a.k.a., the Oscars™). The user may be asked to choose a roster of actors and actresses in each award category, and may be able to trade, swap, and otherwise change the roster after the start of the award show. The fantasy contest may be over a subevent of the award show, such as five award announcements. The fantasy contest application may pose bonus questions asking for an instant prediction on the winner of a particular award. The fantasy sports contest application may pose bonus questions using themes from the user's roster of picks, the instant action in the award show, and other relevant factors. In general, all aspects of the present invention described in a sports related setting may be easily adapted for use in any non-sports setting.

Thus, systems and methods for providing fantasy sports contests based, in whole or in part, on subevents have been taught. One skilled in the art will appreciate that the present invention can be practiced by other than the described embodiments, which are presented for purposes of illustration and not of limitation, and the present invention is limited only by the claims which follow.

What is claimed is:

1. A method for providing a fantasy sports contest to a user, using a fantasy sports contest application, the method comprising:
providing a broadcast of a sporting game to the user on a display screen;
providing, during the broadcast of the sporting game, the user with the ability to join a fantasy sports contest based on a remaining portion of the sporting game;

providing the user with the ability to select at least one athlete from the sporting game to include in a fantasy sports contest team roster, wherein the fantasy sports team roster is associated with the fantasy sports contest; and awarding points to the user based on the performance of the fantasy sports team roster during the remaining portion of the sporting game and not on an earlier portion of the sporting game.

2. The method of claim 1 wherein providing the user with the ability to select at least one athlete from the sporting game comprises providing the user with the ability to select at least one athlete from a sporting game involving a local sports team.

3. The method of claim 1 further comprising:
providing bonus questions associated with the fantasy sports contest team roster; and
scoring the fantasy sports contest based, at least in part, on the bonus questions.

4. The method of claim 3 wherein providing bonus questions comprises querying the user for a prediction on real-life action associated with athletes on the fantasy sports contest team roster during the remaining portion of the sporting game.

5. The method of claim 3 wherein providing bonus questions comprises providing trivia questions associated with athletes on the fantasy sports contest team roster.

6. A method for providing a fantasy sports contest application comprising:
providing a broadcast of a sporting game on a display screen;
enabling, during broadcast of the sporting game, a user to create a customized fantasy sports contest based on the performance of athletes during a remaining portion of the sporting game and not on an earlier portion of the sporting game;
enabling the user to propose the customized fantasy sports contest to other users; and
allowing the user to participate in the customized fantasy sports contest with the other users.

7. The method of claim 6 wherein enabling a user to create a customized fantasy sports contest comprises enabling the user to set at least one of a set of scoring rules and a duration for the customized fantasy sports contest.

8. A system for providing a fantasy sports contest to a user, using a fantasy sports contest application, the system comprising:
means for providing a broadcast of a sporting game to the user on a display screen;
means for providing, during the broadcast of the sporting game, the user with the ability to join a fantasy sports contest based on a remaining portion of the sporting game;
means for providing the user with the ability to select at least one athlete from the sporting game to include in a fantasy sports contest team roster, wherein the fantasy sports team roster is associated with the fantasy sports contest; and
means for awarding points to the user based on the performance of the fantasy sports team roster during the remaining portion of the sporting game and not on an earlier portion of the sporting game.

9. The system of claim 8 wherein means for providing the user with the ability to select at least one athlete from the sporting game comprises means for providing the user with the ability to select at least one athlete from a sporting game involving a local sports team.

10. The system of claim 8 further comprising:
means for providing bonus questions associated with the fantasy sports contest team roster; and
means for scoring the fantasy sports contest based, at least in part, on the bonus questions.

11. The system of claim 10 wherein means for providing bonus questions comprises means for querying the user for a prediction on real-life action associated with athletes on the fantasy sports contest team roster during the remaining portion of the sporting game.

12. The system of claim 10 wherein means for providing bonus questions comprises means for providing trivia questions associated with athletes on the fantasy sports contest team roster.

13. A system for providing a fantasy sports contest application comprising:
means for providing a broadcast of a sporting game on a display screen;
means for enabling, during broadcast of the sporting game, a user to create a customized fantasy sports contest based on the performance of athletes during a remaining portion of the sporting game and not on an earlier portion of the sporting game;
means for enabling the user to propose the customized fantasy sports contest to other users; and
means for allowing the user to participate in the customized fantasy sports contest with the other users.

14. The system of claim 13 wherein means for enabling a user to create a customized fantasy sports contest comprises means for enabling the user to set at least one of a set of scoring rules and a duration for the customized fantasy sports contest.

15. A non-transitory computer readable medium encoded with computer-readable instructions for providing a fantasy sports contest to a user, the computer-readable instructions comprising:
providing a broadcast of a sporting game to the user on a display screen;
providing, during the broadcast of the sporting game, the user with the ability to join a fantasy sports contest based on a remaining portion of the sporting game;
providing the user with the ability to select at least one athlete from the sporting game to include in a fantasy sports contest team roster, wherein the fantasy sports team roster is associated with the fantasy sports contest; and
awarding points to the user based on the performance of the fantasy sports team roster during the remaining portion of the sporting game and not on an earlier portion of the sporting game.

16. The non-transitory computer readable medium of claim 15, wherein the computer-readable instructions for providing the user with the ability to select at least one athlete from the sporting game comprises computer-readable instructions for providing the user with the ability to select at least one athlete from a sporting game involving a local sports team.

17. The non-transitory computer readable medium of claim 15, the computer readable instructions further comprising:
providing bonus questions associated with the fantasy sports contest team roster; and
scoring the fantasy sports contest based, at least in part, on the bonus questions.

18. The non-transitory computer readable medium of claim 15 wherein the computer-readable instructions for providing bonus questions comprises computer-readable instructions for querying the user for a prediction on real-life action associated with athletes on the fantasy sports contest team roster during the remaining portion of the sporting game.

19. The non-transitory computer readable medium of claim 18 wherein the computer-readable instructions for providing bonus questions comprises computer-readable instructions for providing trivia questions associated with athletes on the fantasy sports contest team roster.

20. A non-transitory computer readable medium encoded with computer-readable instructions for providing a fantasy sports contest application, the computer-readable instructions comprising:
  providing a broadcast of a sporting game on a display screen;
  enabling, during broadcast of the sporting game, a user, to create a customized fantasy sports contest based on the performance of athletes during a remaining portion of the sporting game and not an earlier portion of the sporting game;
  enabling the user to propose the customized fantasy sports contest to other users; and
  allowing the user to participate in the customized fantasy sports contest with the other users.

21. The non-transitory computer readable medium of claim 20 wherein the computer-readable instructions for enabling a user to create a customized fantasy sports contest comprises computer readable instructions for enabling the user to set at least one of a set of scoring rules and a duration for the customized fantasy sports contest.

22. A system for providing a fantasy sports contest to a user, using a fantasy sports contest application, the system comprising:
  a user input device;
  a user output device comprising a display device; and
  processing circuitry configured to;
  provide a broadcast of a sporting game to the user on the display device;
  provide, during the broadcast of the sporting game, the user with the ability to join a fantasy sports contest based on a remaining portion of the sporting game;
  provide the user with the ability to select at least one athlete from the sporting game to include in a fantasy sports contest team roster, wherein the fantasy sports team roster is associated with the fantasy sports contest; and
  award points to the user based on the performance of the fantasy sports team roster during the remaining portion of the sporting game and not on an earlier portion of the sporting game.

23. The system of claim 22 wherein the processing circuitry configured to provide the user with the ability to select at least one athlete from the sporting game comprises processing circuitry configured to provide the user with the ability to select at least one athlete from a sporting game involving a local sports team.

24. The system of claim 22, wherein the processing circuitry is further configured to:
  provide bonus questions associated with the fantasy sports contest team roster; and
  score the fantasy sports contest based, at least in part, on the bonus questions.

25. The system of claim 24 wherein the processing circuitry configured to provide bonus questions comprises processing circuitry configured to query the user for a prediction on real-life action associated with athletes on the fantasy sports contest team roster during the remaining portion of the sporting game.

26. The system of claim 24 wherein the processing circuitry configured to provide bonus questions comprises processing circuitry configured to provide trivia questions associated with athletes on the fantasy sports contest roster.

27. A system for providing a fantasy sports contest application comprising:
  a user input device;
  a user output device comprising a display device; and
  processing circuitry configured to:
  provide a broadcast of a sporting game on the display device;
  enable, during broadcast of the sporting game, a user to create a customized fantasy sports contest based on the performance of athletes during a remaining portion of the sporting game and not on an earlier portion of the sporting game;
  enable the user to propose the customized fantasy sports contest to other users; and
  allow the user to participate in the customized fantasy sports contest with the other users.

28. The system of claim 27 wherein the processing circuitry configured to enable a user to create a customized fantasy sports contest comprises processing circuitry configured to enable the user to set at least one of a set of scoring rules and a duration for the customized fantasy sports contest.

* * * * *